United States Patent
Deng et al.

(10) Patent No.: US 11,659,538 B2
(45) Date of Patent: May 23, 2023

(54) MMW PHYSICAL LAYER DOWNLINK CHANNEL SCHEDULING AND CONTROL SIGNALING

(71) Applicant: IDAC HOLDINGS, INC., Wilmington, DE (US)

(72) Inventors: Tao Deng, Roslyn, NY (US); Yugeswar Deenoo, Chalfont, PA (US); Philip J. Pietraski, Jericho, PA (US); Ravikumar V. Pragada, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/019,127

(22) Filed: Sep. 11, 2020

(65) Prior Publication Data
US 2021/0014847 A1    Jan. 14, 2021

Related U.S. Application Data

(63) Continuation of application No. 16/560,932, filed on Sep. 4, 2019, now abandoned, which is a continuation
(Continued)

(51) Int. Cl.
*H04W 72/04* (2009.01)
*H04W 72/12* (2009.01)
(Continued)

(52) U.S. Cl.
CPC ...... *H04W 72/046* (2013.01); *H04W 72/1289* (2013.01); *H04W 84/045* (2013.01)

(58) Field of Classification Search
CPC ........... H04W 72/046; H04W 72/1289; H04W 84/045
See application file for complete search history.

(56) References Cited

U.S. PATENT DOCUMENTS

| 8,401,484 B2 | 3/2013 | Kimura et al. |
| 8,971,817 B2 | 3/2015 | Morioka et al. |

(Continued)

FOREIGN PATENT DOCUMENTS

| CN | 101873156 A | 10/2010 |
| CN | 102308612 A | 1/2012 |

(Continued)

OTHER PUBLICATIONS

3rd Generation Partnership Project (3GPP), TR 36.814 V9.0.0, "Technical Specification Group Radio Access Network, Evolved Universal Terrestrial Radio Access (E-UTRA), Further Advancements for E-UTRA Physical Layer Aspects (Release 9)", Mar. 2010, pp. 1-104.

(Continued)

*Primary Examiner* — Melvin C Marcelo
(74) *Attorney, Agent, or Firm* — Condo Roccia Koptiw LLP

(57) ABSTRACT

A wireless transmit/receive unit (WTRU) (e.g., a millimeter WTRU (mWTRU)) may receive a first control channel using a first antenna pattern. The WTRU may receive a second control channel using a second antenna pattern. The WTRU may demodulate and decode the first control channel. The WTRU may demodulate and decode the second control channel. The WTRU may determine, using at least one of: the decoded first control channel or the second control channel, beam scheduling information associated with the WTRU and whether the WTRU is scheduled for an mmW segment. The WTRU may form a receive beam using the determined beam scheduling information. The WTRU receive the second control channel using the receive beam. The WTRU determine, by demodulating and decoding the second control channel, dynamic per-TTI scheduling infor- (Continued)

mation related to a data channel associated with the second control channel.

16 Claims, 32 Drawing Sheets

Related U.S. Application Data of application No. 16/184,403, filed on Nov. 8, 2018, now Pat. No. 10,448,404, which is a continuation of application No. 15/302,721, filed as application No. PCT/US2015/025195 on Apr. 9, 2015, now Pat. No. 10,172,135.

(60) Provisional application No. 61/977,613, filed on Apr. 9, 2014.

(51) Int. Cl.
  H04W 72/044 (2023.01)
  H04W 84/04 (2009.01)

(56) References Cited

U.S. PATENT DOCUMENTS

| | | | |
|---|---|---|---|
| 9,312,940 B2 | 4/2016 | Takano et al. | |
| 9,351,293 B2 | 5/2016 | Chen et al. | |
| 2011/0316744 A1 | 12/2011 | Morioka et al. | |
| 2013/0163543 A1 | 6/2013 | Freda et al. | |
| 2013/0295852 A1 | 11/2013 | Kim et al. | |
| 2014/0072078 A1 | 3/2014 | Sergeyev et al. | |
| 2016/0007371 A1 | 1/2016 | Pietraski et al. | |
| 2016/0118716 A1 | 4/2016 | Stephenne et al. | |
| 2016/0330643 A1 | 11/2016 | Sahin et al. | |
| 2017/0338925 A1 | 11/2017 | Wei et al. | |
| 2019/0132829 A1* | 5/2019 | Bhattad | H04L 27/2605 |
| 2020/0145172 A1 | 5/2020 | Zhou et al. | |
| 2020/0178279 A1 | 6/2020 | Frenne et al. | |
| 2020/0178350 A1 | 6/2020 | Miao et al. | |
| 2021/0307033 A1* | 9/2021 | Josan | H04B 7/0837 |

FOREIGN PATENT DOCUMENTS

| | | | | |
|---|---|---|---|---|
| CN | 102318392 A | 1/2012 | | |
| CN | 102577559 A | 7/2012 | | |
| EP | 2405707 A1 | 1/2012 | | |
| WO | 2014/036150 A1 | 3/2014 | | |
| WO | WO-2022040654 A1 * | 2/2022 | | H04B 7/088 |

OTHER PUBLICATIONS

3rd Generation Partnership Project (3GPP), TR 36.872 V12.0.0, "Technical Specification Group Radio Access Network, Small Cell Enhancements for E-UTRA and E-UTRAN—Physical Layer Aspects (Release 12)", Sep. 2013, pp. 1-78.
3rd Generation Partnership Project (3GPP), TR 36.942 V11.0.0, "Technical Specification Group Radio Access Network, Evolved Universal Terrestrial Radio Access (E-UTRA), Radio Frequency (RF) System Scenarios (Release 11)", Sep. 2012, pp. 1-109.
3rd Generation Partnership Project (3GPP), TS 36.211 V11.0.0, "Technical Specification Group Radio Access Network, Evolved Universal Terrestrial Radio Access (E-UTRA), Physical Channels and Modulation (Release 11)", Sep. 2012, pp. 1-106.
3rd Generation Partnership Project (3GPP), TS 36.213 V11.0.0, "Technical Specification Group Radio Access Network, Evolved Universal Terrestrial Radio Access (E-UTRA), Physical Layer Procedures (Release 11)", Sep. 2012, pp. 1-143.
3rd Generation Partnership Project (3GPP), TS 36.321 V11.0.0, "Technical Specification Group Radio Access Network, Evolved Universal Terrestrial Radio Access (E-UTRA), Medium Access Control (MAC) Protocol Specification", Sep. 2012, pp. 1-55.
3rd Generation Partnership Project (3GPP), TS 36.331 V11.0.0, "Technical Specification Group Radio Access Network, Evolved Universal Terrestrial Radio Access (E-UTRA), Radio Resource Control (RRC), Protocol Specification (Release 11)", Jun. 2012, pp. 1-302.
Dahlman et al., "4G—LTE/LTE-Advanced for Mobile Broadband", AP, 2011, 447 pages.
Raaf et al., "Vision for Beyond 4G Broadband Radio Systems", IEEE 22nd International Symposium on Personal, Indoor and Mobile Radio Communications, 2011, pp. 2369-2373.
Rappaport et al., "Millimeter Wave Mobile Communications for 5G Cellular: It Will Work", IEEE Access Journal, vol. 1, May 10, 2013, pp. 335-349.
Rappaport, Theodore S., "Wireless Communications: Principles and Practice (2nd Edition)", Prentice Hall, 2002, 332 pages.
Sesia et al., "LTE—The UMTS Long Term Evolution: From Theory to Practice", John Wiley & Sons, Ltd., 2009, 626 pages.

* cited by examiner

MMW PHYSICAL LAYER DOWNLINK CHANNEL SCHEDULING AND CONTROL SIGNALING

CROSS REFERENCE TO RELATED APPLICATIONS

This application is a continuation application of U.S. Non-Provisional application Ser. No. 16/560,932, filed Sep. 4, 2019, which is a continuation application of U.S. Non-Provisional application Ser. No. 16/184,403, filed Nov. 8, 2018 which is a continuation application of U.S. Non-Provisional application Ser. No. 15/302,721, filed Oct. 7, 2016, now issued U.S. Pat. No. 10,172,135, which is the National Stage Entry under 35 U.S.C. § 371 of Patent Cooperation Treaty Application No. PCT/US2015/025195, filed Apr. 9, 2015, which claims the benefit of U.S. Provisional Patent Application No. 61/977,613 filed on Apr. 9, 2014, the contents of which are hereby incorporated by reference herein.

BACKGROUND

For the last few decades the number of mobile devices has grown exponentially thereby resulting in increase in demand for data and data delivery capacity of mobile wireless networks. In order to meet this rapidly growing demand for mobile data, a large number of smaller cells may be deployed. However, the bandwidth provided by heterogeneous networks include macro and small cell networks may not be adequate. Therefore other mechanisms, for example, use of millimeter wave (mmW) frequencies may be utilized to provide significant capacity improvement related to user-specific data transmission. The narrow beam pattern of mmW beams, however, may pose challenges for standalone mmW base station solutions, e.g., in delivering cell-specific and/or broadcast information.

SUMMARY

A wireless transmit/receive unit (WTRU), e.g., a millimeter wave WTRU (mWTRU) may receive a first control channel using a first antenna pattern. The first control channel may be one of: a common physical downlink directional control channel (PDDCCH), a physical downlink control channel (PDCCH), an enhanced PDCCH (EPDCCH), or a millimeter wave physical downlink control channel (mmPDCCH). The first control channel may be configured per beam. The first control channel may be read by multiple WTRUs. The first control channel may be carried using a broad beam (e.g., a long term evolution (LTE) beam) or a millimeter (mmW) beam.

The WTRU may receive a second control channel (e.g., a dedicated PDDCCH) using a second antenna pattern. The WTRU may demodulate and decode the first control channel and the second control channel. The resource allocation of the first control channel and/or the second control channel may be received from a network, e.g., via higher layers signaling. The first control channel may be carried using a mmW beam or an LTE beam that may be wider than the mmW beam used to carry the second control channel.

The WTRU may determine, using at least one of: the decoded first control channel or the decoded second control channel, beam scheduling information associated with the WTRU and whether the WTRU is scheduled for an mmW segment. The beam scheduling information may include transmit and receive beam scheduling information. The WTRU may form a receive beam using the determined beam scheduling and receive the second control channel using the receive beam, when the WTRU is scheduled for the mmW segment. The WTRU may determine, by demodulating and decoding the second control channel, dynamic per-transmission time interval (TTI) scheduling information related to a data channel (e.g., a physical downlink directional data channel (PDDDCH)) associated with the second control channel. The WTRU may receive the data channel using the dynamic per-TTI scheduling information.

The WTRU may determine a validity period associated with per-TTI scheduling information and applying the per-TTI scheduling information to one or more mmW TTIs. The per-TTI scheduling information is identical for a plurality of consecutive TTIs within a subframe.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
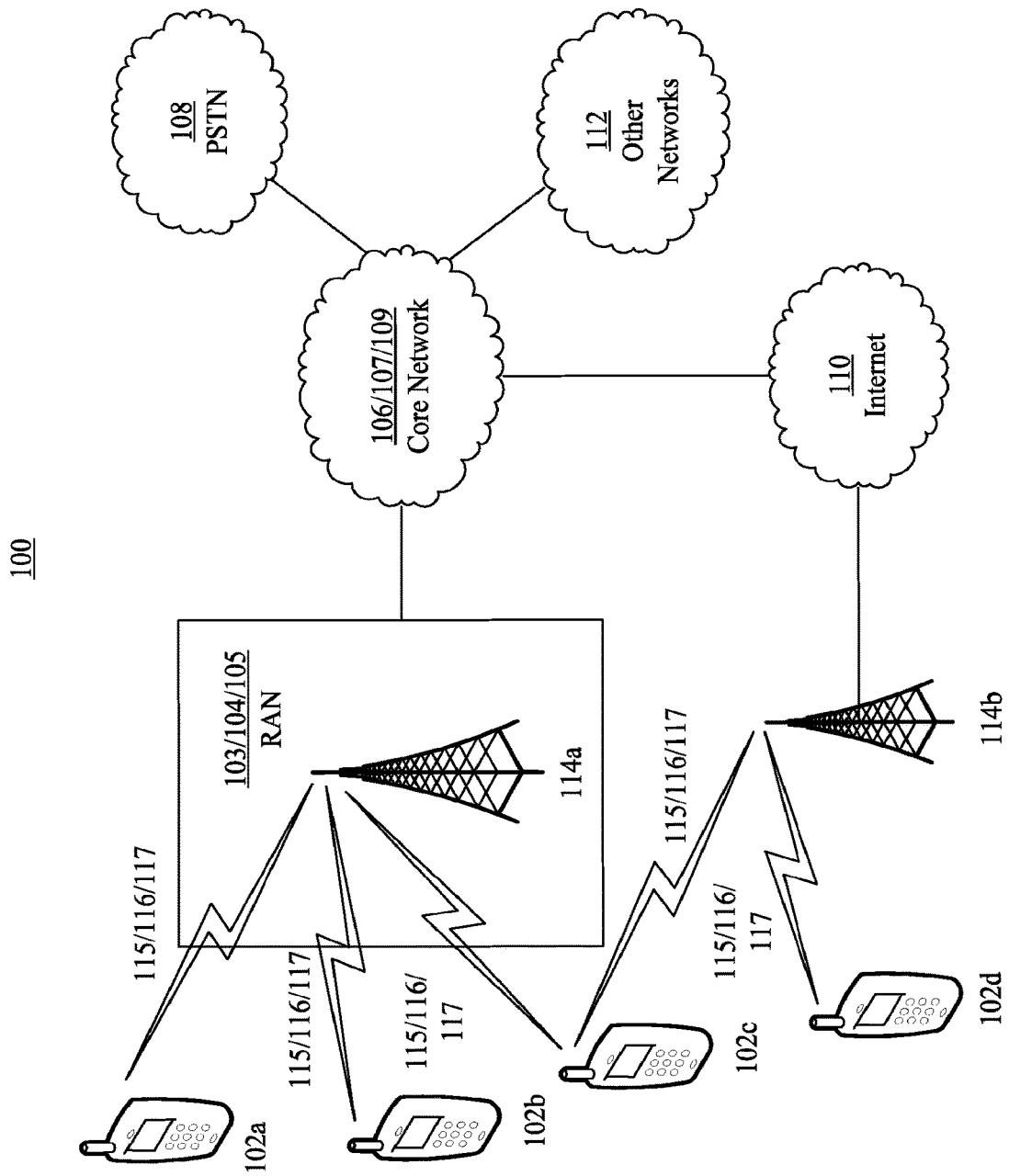
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
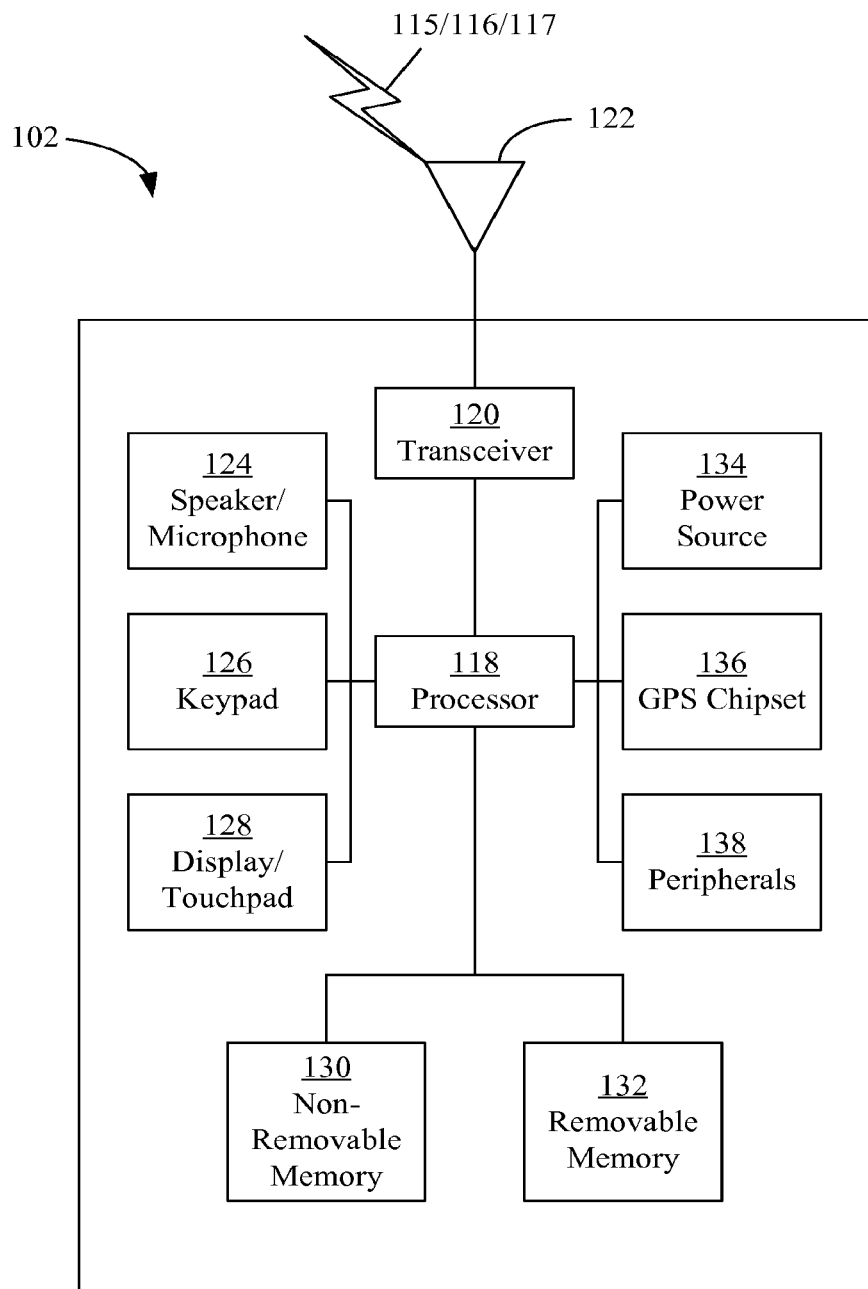
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip. A processor, such as the processor 118, may include integrated memory (e.g., WTRU 102 may include a chipset that includes a processor and associated memory). Memory may refer to memory that is integrated with a processor (e.g., processor 118) or memory that is otherwise associated with a device (e.g., WTRU 102). The memory may be non-transitory. The memory may include (e.g., store) instructions that may be executed by the processor (e.g., software and/or firmware instructions). For example, the memory may include instructions that when executed may cause the processor to implement one or more of the implementations described herein.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130, the removable memory 132, and/or memory integrated with the processor 118. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
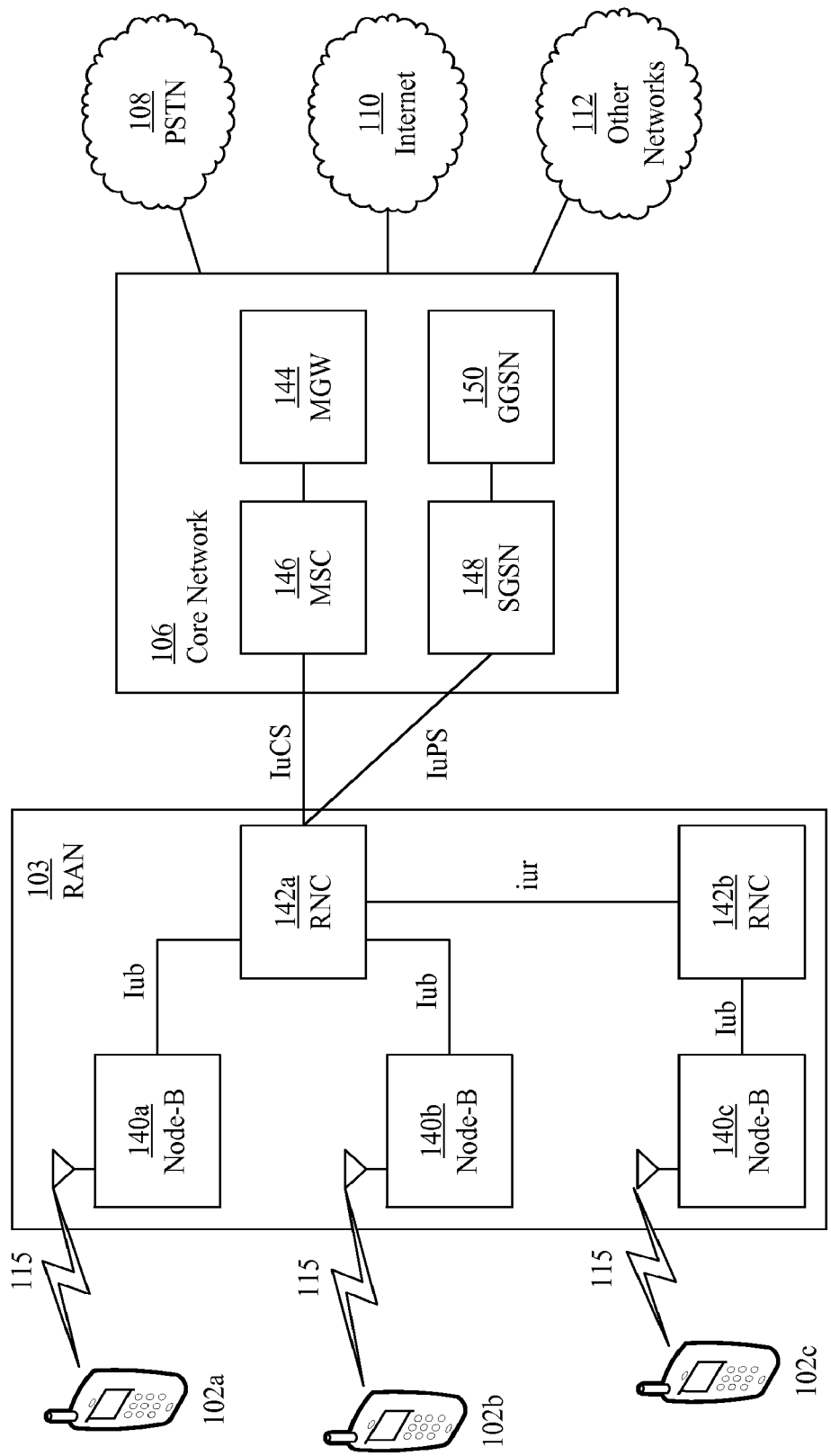
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
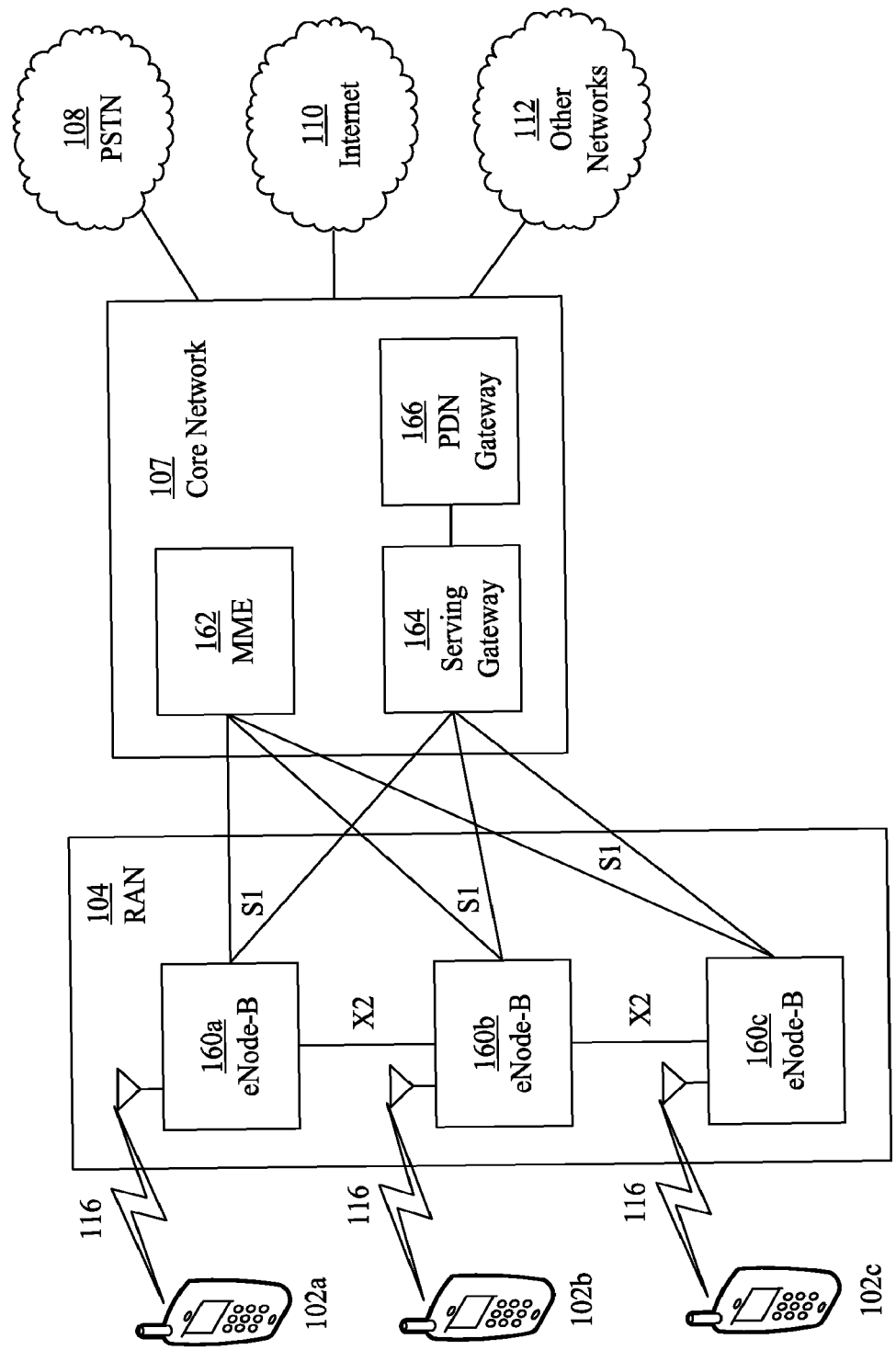
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
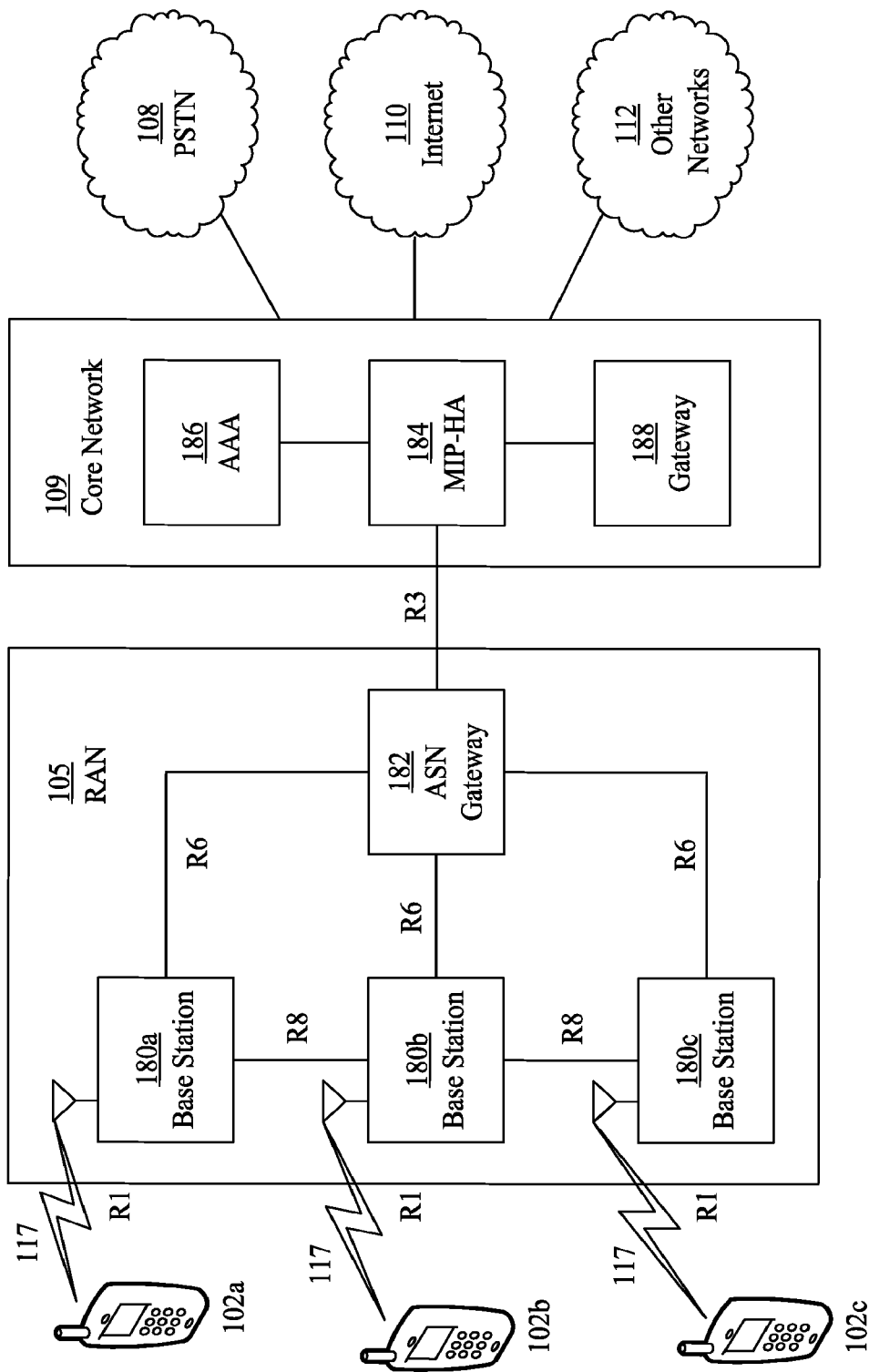
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Millimeter wave (mmW) systems may provide a large bandwidth that may provide capacity improvement for user-specific data transmission. The narrow beam patterns used in mmW systems may pose challenges for a standalone mmW-only eNodeB (eNB) solution, e.g., in delivering cell-specific or broadcast information. A beam pattern may be referred to as an antenna pattern, an antenna beam pattern, a beam direction, or a channel. The beam pattern may be associated with a reference signal (e.g., unique reference signal) or an antenna port. mmW system design may incorporate an add-on downlink mmW data transmission system into a small cell LTE network.

A standalone mmW eNB may be provided. A small cell mmW eNB (SCmB) deployment may be based on a small cell deployment (e.g., a Third Generation Partnership Project (3GPP), Release 12 (R12) based small cell deployment). mmW operation in such a deployment may be performed, for example, by two network nodes. A small cell mmW eNB (SCmB) may be an long term evolution (LTE) small cell eNB that may be capable of operating an mmW air interface. In parallel, the LTE small cell eNB may operate with an LTE air interface in the downlink. An SCmB may provide an antenna configuration and beamforming technique that may allow the SCmB to transmit LTE channels in a wide beam pattern and mmW channels in a narrow beam pattern. The SCmB may transmit the wide beam pattern and the narrow beam pattern. The wide beam pattern and the narrow beam pattern may be transmitted simultaneously. To support WTRUs without mmW transmitters, the SCmB may support a mode in which the uplink may operate the LTE air interface, e.g., only the LTE air interface. WTRU, e.g., an mmW WTRU (mWTRU), may be capable of operating an mmW downlink air interface in parallel with the LTE air interface in the downlink. The mWTRU may have multiple sets of antennas (e.g., two sets of antennas), and associated radio frequency (RF) chains (e.g., one operating in an LTE band and another operating in an mmW band). Each instance of antenna and an RF chain may be associated with a baseband processing function (e.g., an independent baseband processing function). The plurality of baseband functions may share one or more blocks, for example, if the mmW air interface is similar to the LTE system. The mmW hardware and/or software may be implemented as a receiver.

One or more mmW channels (e.g., add-on mmW channels) may be implemented as part of a carrier aggregation scheme. In such a carrier aggregation scheme, a carrier type may be in an mmW frequency band but may apply a different air interface. mmW channels may be applied for high throughput or low latency traffic data applications. Control signaling, which may include system information update, paging, radio resource control (RRC) and non-access stratum (NAS) signaling (e.g., signaling radio bearers), and/or multicast traffic, may be carried in LTE channels. Certain mmW control signaling may use LTE channels.

Figure 2:
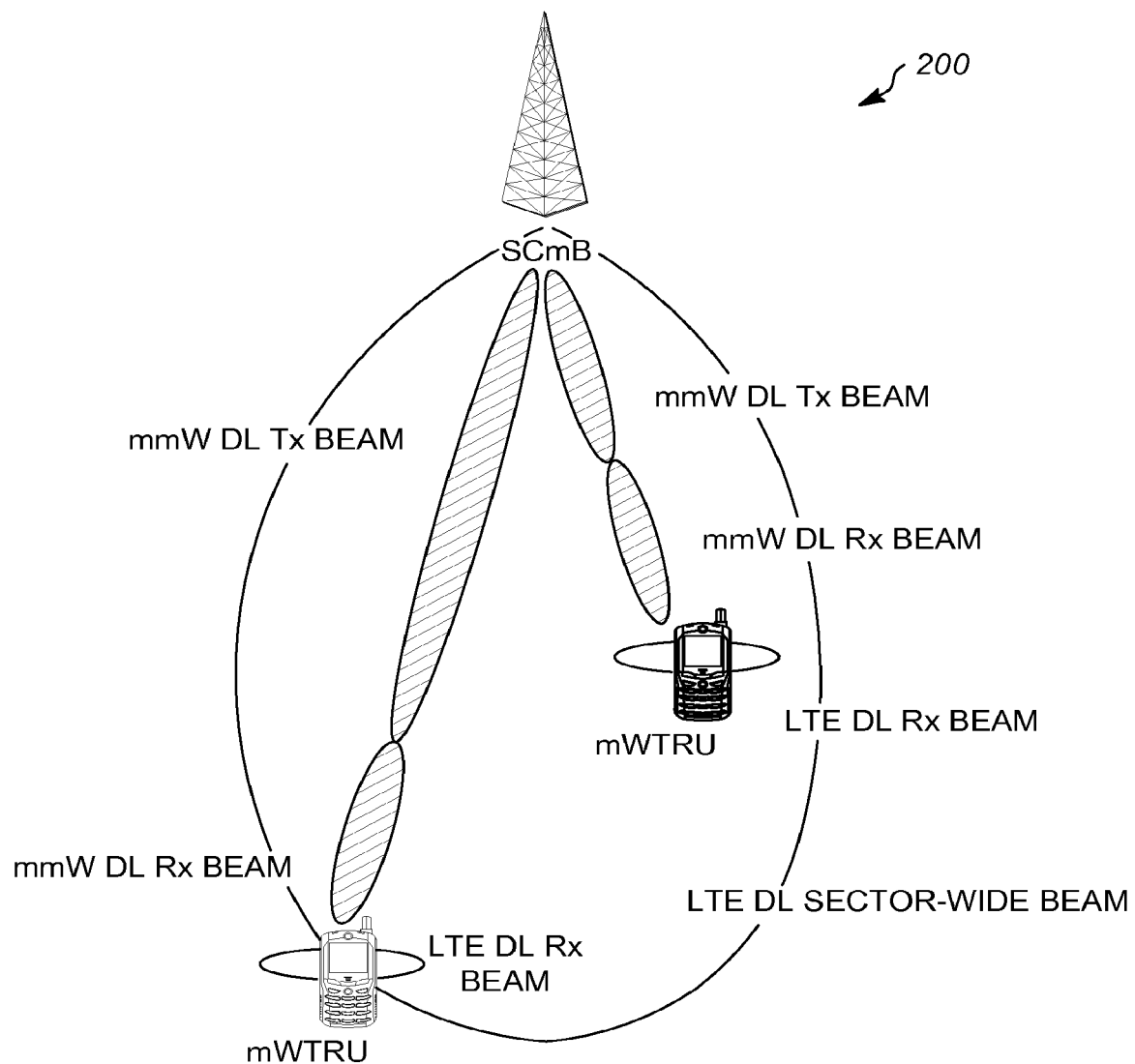
FIG. 2 illustrates an exemplary millimeter wave (mmW) downlink system.

FIG. 2 illustrates an exemplary mmW downlink data system 200. As illustrated in FIG. 2, due to potentially significant propagation loss, for example, in non-line-of-sight (NLOS) at the mmW frequency band, SCmB and/or mWTRU may employ narrow beamforming in transmit (Tx) and/or receive (Rx) directions to ensure a satisfactory link budget for high throughput and low latency traffic data. An example outage study conducted at 28 GHz and 38 GHz in an urban area using a steerable 10° beam 24.5 dBi horn antenna at both the transmitter and the receiver may indicate that a consistent coverage may be achieved with a cell radius of 200 meters when such antennas are used.

The SCmB and mWTRU may employ a wider beam pattern for LTE operation, which may include cell search, random access, cell selection and/or reselection, etc. An omni-directional radiation pattern with an antenna gain of 0 dBi may be used in simulation and development of LTE technologies, including beamforming.

Figure 3:
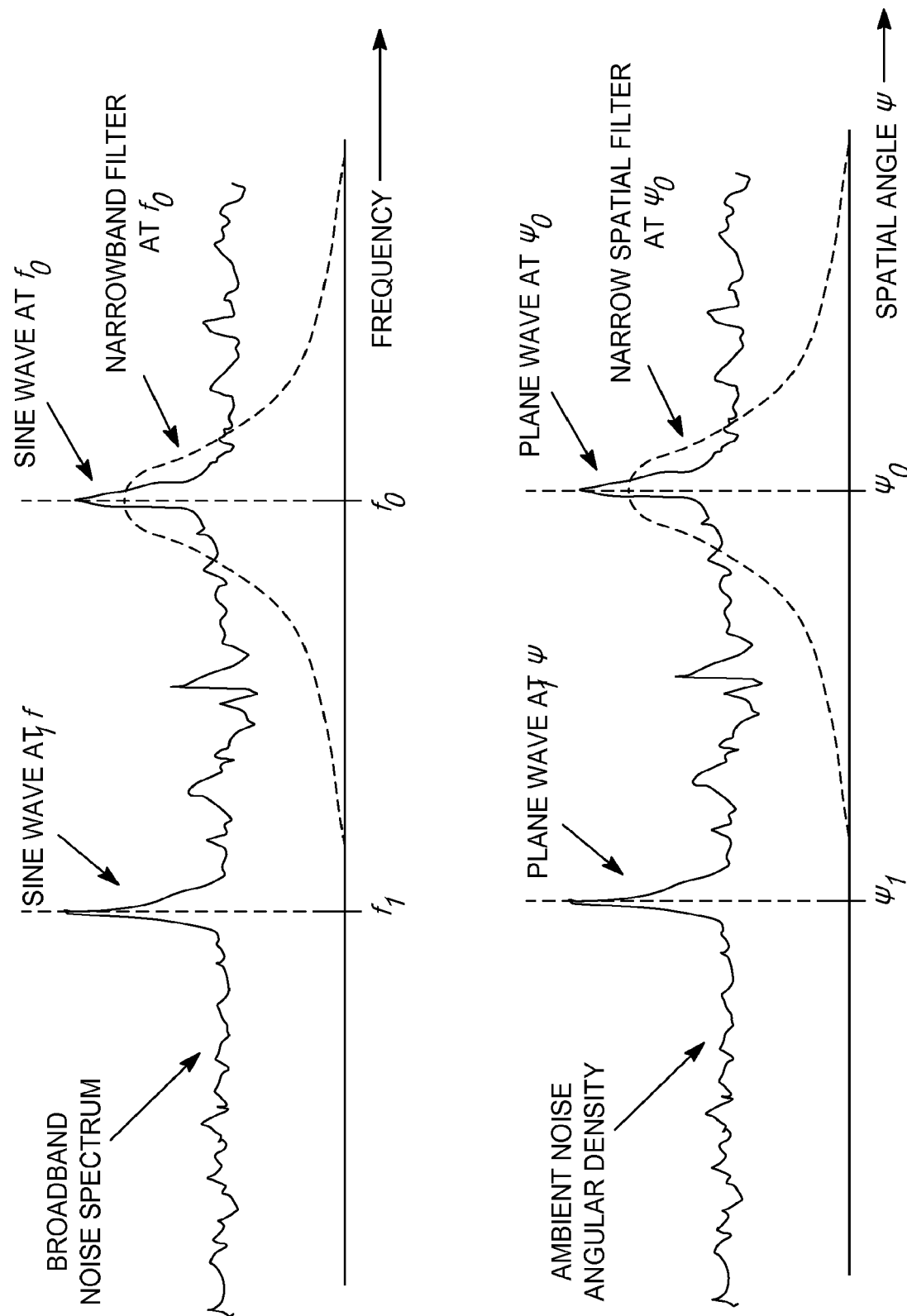
FIG. 3 illustrates examples of frequency and spatial filtering.

The mmW downlink data system 200 may identify and mitigate the impact of the directivity in mmW transmit and/or receive beam patterns on a set of procedures that may include mmW physical layer control signaling, physical layer data scheduling, beam or channel measurement and feedback, transmit and/or receive beam alignment, etc. Receive beamforming may perform a narrow spatial filtering, as illustrated in FIG. 3 so that a mWTRU may see a channel impulse response in a specific spatial direction. A LTE WTRU may have an omni-directional receive beam pattern and may perceive a superimposed channel impulse response over the angular domain, e.g., the entire angular domain.

FIG. 3 illustrates a comparison between a frequency domain filtering and spatial/angular domain filtering. An aligned transmit/receive beam may provide an extra degree of freedom in the angular domain and may afford the mmW layer a greater degree of spatial separation relative to an LTE system. This may be a result of the propagation of mmW and the large number of antenna elements that may be included in an mmW antenna. For example, the spatial filtering may result in an effective channel that may be fairly flat by excluding paths outside of its beam width.

The mmW system may use a carrier frequency of 28 GHz, 38 GHz, 60 GHz, etc. The system bandwidth may be variable, e.g., up to 1 GHz. The estimated RMS delay spread may be approximately 100-200 ns with a narrow beam pattern. Latency may be 1 ms. The waveform may be orthogonal frequency division multiplexing (OFDM)-based or broadband single-carrier based. Connectivity may be provided via an LTE small cell eNB with mmW add-on channels and a plurality of RF chains, each connected to a different antenna. The data rate may be, e.g., 30 Mbit/s or more in the downlink for 95% or more of WTRUs. Mobility may be achieved by providing an optimized data connection that may be sustained, for example, at a speed of 3 km/h, and/or a data connection that may be maintained, for example, at a speed of 30 km/h. Data rate and mobility criteria may be met with a cell radius of, for example, less than 100 meters.

The candidates for the mmW air interface may include one or more of broadband cyclic prefixed single carrier (CP-SC), orthogonal frequency division multiplexing (OFDM), single carrier (SC)-OFDM, or multiple carrier-code division multiple access (MC-CDMA). The aspects of one or more of peak-to-average power ratio (PAPR) performance, sensitivity to transmitter non-linearity, bit error rate (BER) performance with different equalization schemes ((zero-forcing decision feedback equalization (ZF-DFE) or frequency-domain linear equalization (FD-LE)), resource channelization, multiple access scheme, or implementation complexity of each candidate may be taken into account, e.g., with the help of a simulation based on mmW channel modeling A single carrier waveform may have good PAPR properties compared to OFDM, but may lack the ability to schedule resources dynamically in the frequency domain and may be more difficult to channelize. The narrow beams of the mmW antennas may limit the ability to perform frequency domain scheduling. A simulation with accurate mmW channel modeling may be used for a proper evaluation.

The OFDM waveform may be utilized. The SCmB may operate LTE and mmW air interfaces, and a similar waveform may facilitate functional block sharing between these two implementations, e.g., clock distribution and fast fourier transform (FFT) block. One or more implementations disclosed herein may be disclosed in the context of an OFDM-based mmW waveform. However, certain system procedures may apply to a single carrier waveform, e.g., with minor modifications.

An OFDM frame structure may be provided. For example, to promote flexibility in coordination between the LTE and mmW channels and possibly enable common functional block sharing in an mWTRU device, the mmW sampling frequency may be an integer multiple of the LTE minimum sampling frequency of 1.92 MHz. An mmW OFDM system may adopt a subcarrier spacing $\Delta f$ that may be an integer multiple of the LTE subcarrier spacing of 15 kHz, e.g., $\Delta f=15*K$ kHz. The selection of the integer multiple K and the resulting $\Delta f$ may achieve a balance between the sensitivity to the Doppler shift and different types of frequency errors and the ability to remove channel time dispersion. Orthogonality between subcarriers may deteriorate and inter-subcarrier interference may increase when the Doppler shift increases in proportion to the subcarrier spacing.

As the mmW downlink data link targets up to 30 km/h, the maximum Doppler shift at 28 GHz may be 778 Hz. The channel time dispersion on mmW frequencies may be measured, and an example 28 GHz measurement in a dense urban area indicates that an example root mean square (RMS) delay spread $\sigma$ may be between 100 and 200 ns. The 90% coherence bandwidth may be estimated at $1/50\sigma$ 100 kHz and the 50% coherence bandwidth at $1/5\sigma$ 1 MHz. A subcarrier spacing between 100 kHz and 1 MHz may be reasonable. An example $\Delta f$ may be 300 kHz, e.g., K=20. The wide subcarrier spacing may be robust against Doppler shift and other types of frequency error, which may reduce the implementation difficulty.

The symbol length $T_{symbol}$ of the OFDM system may be $1/\Delta f$. If the subcarrier spacing $\Delta f$ is 300 kHz, the symbol length $T_{symbol}$ may be 3.33 μs. The cyclic parameter (CP) length may cover the entire length of the channel time dispersion to eliminate inter-symbol interference, but the CP may carry the cost of additional power and reduced data rate, e.g., a system overhead. In an example in which $T_{symbol}$ is 3.33 μs, the CP length $T_{CP}$ may be selected as $1/14$ of $T_{symbol}$, e.g., 0.24 μs, and the corresponding CP overhead may be 7% as calculated by $T_{CP}/(T_{CP}+T_{symbol})$.

To achieve low latency, the transmission time interval (TTI) length of the mmW downlink data enhancement may be reduced significantly compared to the 1 ms TTI length of the LTE system. The mmW downlink may have a subframe length of 1 ms to line up with the LTE 1 ms subframe timing. The mmW subframe may include multiple TTIs, and the TTI length may be closely tied to other frame structure parameters, such as subcarrier spacing, symbol length, CP length, FFT size, etc. Table 1 illustrates an example list of OFDM parameters with a conservative CP, e.g., 4× channel delay spread. CP length selection may be based on an assumption that the delay spread over mmW frequencies may be lower than 200 ns.

TABLE 1

| OFDM Numerology Parameters | | | | |
| --- | --- | --- | --- | --- |
| System bandwidth (MHz) | 125 | 250 | 500 | 1000 |
| Sampling rate (MHz) | 153.6 | 307.2 | 614.4 | 1228.8 |
| Sub-carrier spacing (kHz) | 300 | 300 | 300 | 300 |
| Number of sub-carrier per RB | 12 | 12 | 12 | 12 |
| RB bandwidth (MHz) | 3.6 | 3.6 | 3.6 | 3.6 |
| Number of assignable RBs | 32 | 64 | 128 | 256 |
| Number of occupied sub-carriers | 384 | 768 | 1536 | 3072 |
| Occupied bandwidth (MHz) | 115.2 | 230.4 | 460.8 | 921.6 |
| IDFT(Tx)/DFT(Rx) size | 512 | 1024 | 2048 | 4096 |
| OFDM symbol duration (us) | 3.333 | 3.333 | 3.333 | 3.333 |
| CP length (ratio to symbol length) | 1/4 | 1/4 | 1/4 | 1/4 |
| CP length (us) | 0.833 | 0.833 | 0.833 | 0.833 |
| Number of symbols per slot | 24 | 24 | 24 | 24 |
| Slot duration (us) | 100 | 100 | 100 | 100 |
| Sub-frame duration (ms) | 1 | 1 | 1 | 1 |
| Number of slots per sub-frame | 10 | 10 | 10 | 10 |
| Frame duration (ms) | 10 | 10 | 10 | 10 |
| Number of sub-frames per frame | 10 | 10 | 10 | 10 |
| Number of symbols per TTI per RB | 288 | 288 | 288 | 288 |
| Number of symbols per TTI using all RBs | 9216 | 18432 | 36864 | 73728 |
| Signaling overhead | 20% | 20% | 20% | 20% |
| Data rate using uncoded 64QAM (Mbps) | 442.368 | 884.736 | 1769.472 | 3538.944 |
| Spectral efficiency | 3.538944 | 3.538944 | 3.538944 | 3.538944 |

Figure 4:
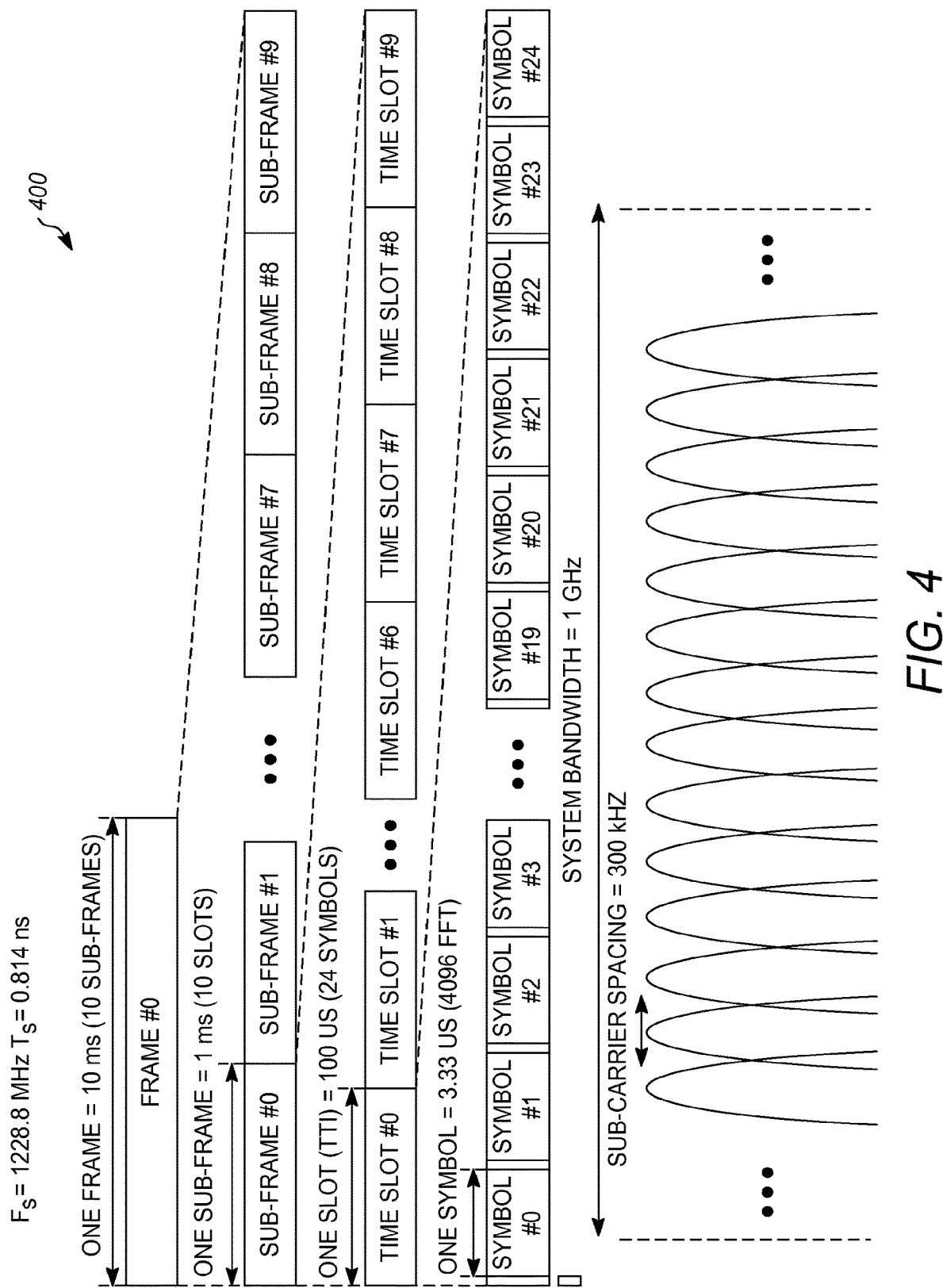
FIG. 4 illustrates an exemplary mmW downlink frame structure.

FIG. 4 illustrates an exemplary frame structure 400 corresponding to the example disclosed in Table 1. A longer CP may be considered for an extended cell radius as the extended CP is designed for in the LTE system. A longer CP may be considered for a more conservative approach to ensure the channel time dispersion is entirely covered in the CP length. The nominal spectral efficiency may decrease as the overhead caused by the CP length increases.

Certain example frame structures are disclosed in the context of an OFDM-based mmW downlink data enhancement that may be incorporated into an OFDM-based LTE small cell network. Other waveform implementations, including, for example, broadband SC and MC-CDMA may use different structures and/or parameters. The general principles disclosed herein may be applicable to other waveform implementations that may be used for mmW transmission.

The mmW downlink data enhancement may employ physical layer channels and reference signals as disclosed herein in addition to LTE physical channels. The mmW downlink data enhancement may employ a beam-specific reference signal (BSRS). BSRS may be a sequence associated with a transmit beam used for beam acquisition, timing and/or frequency synchronization, channel estimation for a physical downlink directional control channel (PDDCCH), fine beam tracking, beam measurement, etc. BSRS may carry (e.g., implicitly carry) beam identity information. There may be different types of BSRS. For example, there may be BSRS for an mmW sector and its member segments. The segment may be used in a switch beam system as disclosed herein and as illustrated, for example, in FIG. 14. The segment may be referred as a beam direction (e.g., a narrow beam direction a wide beam direction).

A physical downlink directional data channel (PDDDCH) may be provided. PDDDCH may carry payload information received as a medium access control protocol data unit (MAC PDU) from the MAC layer. The resource allocation of this channel may be determined by the downlink scheduling information carried in PDDCCH. The PDDDCH for an mWTRU may be transmitted in a narrow transmit beam. The PDDDCH may be received in a paired narrow receive beam. PDDDCHs for different WTRUs in different transmit/receive beam pairs may apply at least one of identical time, frequency, or code resources. Multiple PDDDCHs may operate in a transmit/receive beam pair using multiple access in at least one of time, frequency, or code domains.

A physical downlink directional control channel (PDDCCH) may be provided. The PDDCCH may carry control information associated with data for an mWTRU. The control information may be used to demodulate and/or decode a PDDDCH associated with the PDDCCH. The PDDCCH may operate using a transmit/receive narrow beam pair. The PDDCCH may apply similar multiple user access. The PDDCCH may include a common PDDCCH and/or a dedicated PDDCCH. The dedicated PDDCCH may be associated with a PDDCCH on a per-TTI basis. A common PDDCCH may include beam-specific information, such as segment identity, for an mWTRU to identify the transmit beam. An mWTRU may read the common PDDCCH to find out whether the mWTRU is scheduled and the identification of the mmW beam pair to be used. The common and dedicated PDDCCHs may be placed separately in the time and frequency domains. The common PDDCCH may be carried in a narrow or broad mmW beam. The dedicated PDDCCH may be located in a narrow mmW beam.

A demodulation reference signal (DMRS) may be provided. The DMRS may include signals embedded in the transmission for channel estimation for PDDDCH. The signals may be placed in time and frequency domains, for example, according to a predefined pattern to ensure correct interpolation and reconstruction of the channel.

Figure 5:
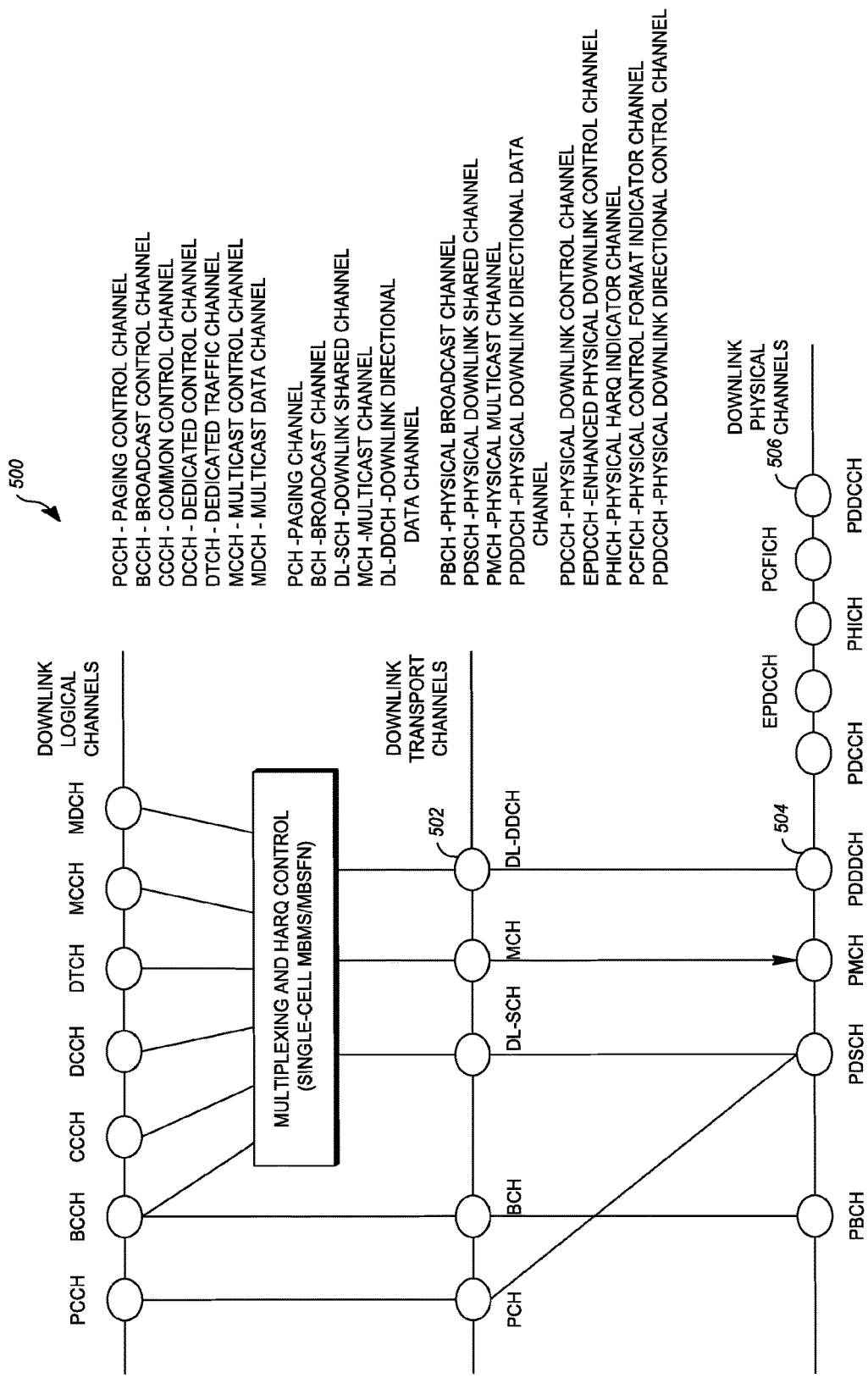
FIG. 5 illustrates exemplary downlink logical, transport, and physical channels in an mmW system.

One or more channels and reference signals may be beamformed identically and may be transmitted via a physical antenna port. The channels may use an mmW frequency band and may be applied for high speed, low latency user traffic applications. FIG. 5 illustrates an example downlink logical, transport, and physical channels in an mmW system 500. The system 500 may adopt a channel mapping with mmW related channels, e.g., channels 502, 504, 506.

Figure 6:
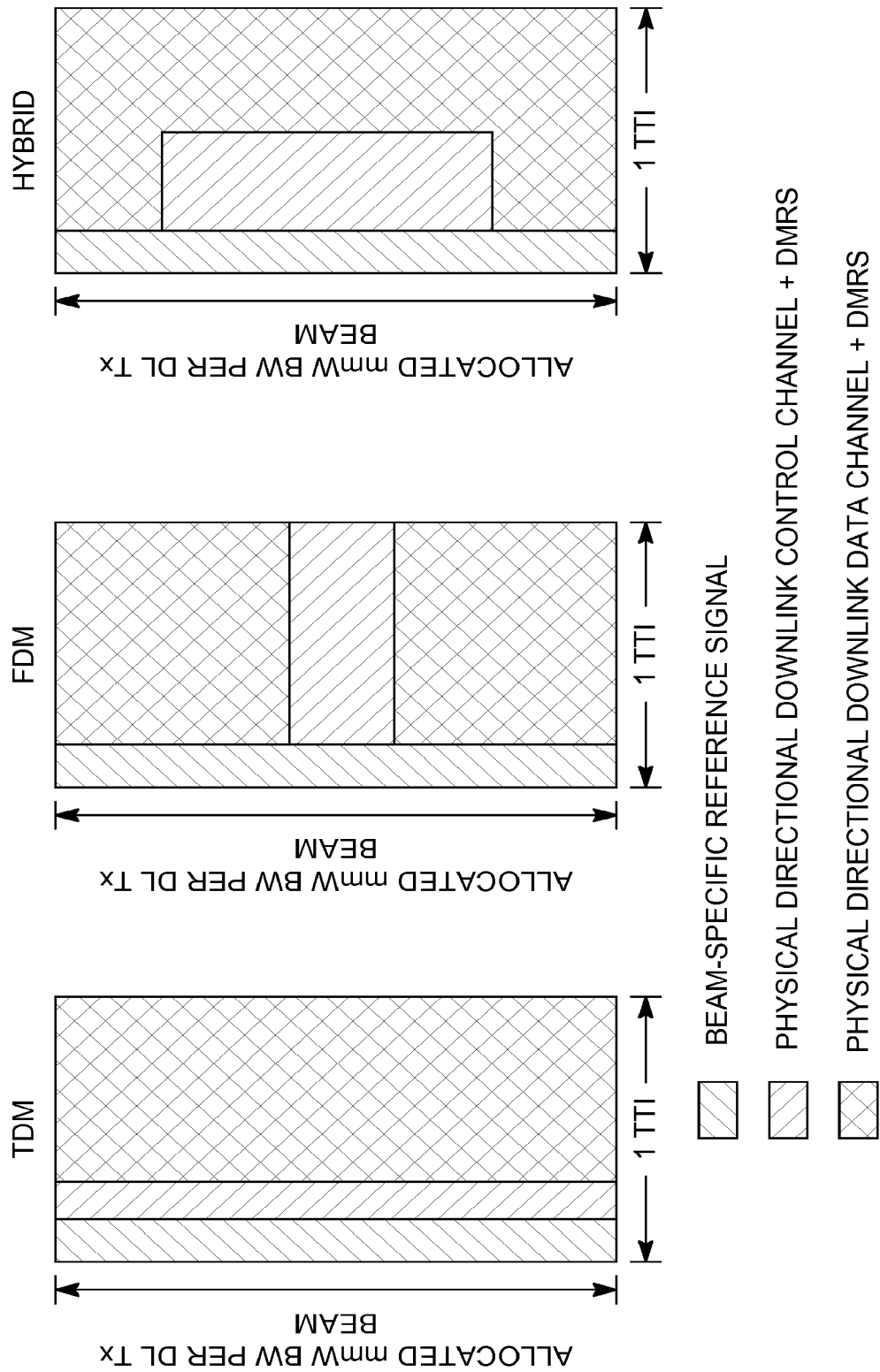
FIG. 6 illustrates an example of multiplexing of a dedicated physical downlink directional control channel (PDDCCH) and a physical downlink directional data channel (PDDDCH).

An mWTRU may have an associated PDDCCH when its data is transmitted in the PDDDCH, e.g., utilizing the mWTRU's transmit/receive beam pair. One or more of Time Division Multiplexing (TDM), Frequency Division Multiplexing (FDM), or Hybrid Multiplexing may be applied. PDDCCH and PDDDCH may be multiplexed in the time domain in a TTI. The PDDCCH may be decoded, and the PDDDCH demodulation and decoding may start before the end of a TTI. This may be less demanding of data buffering resources and may reduce latency. PDDCCH occupancy of the allocated frequency spectrum may reduce the efficiency. PDDCCH and PDDDCH may be multiplexed in the frequency domain in a TTI. PDDCCH and PDDDCH decoding may not start until the end of a TTI. An mWTRU may use a large buffer for the data because the allocated bandwidth may be large in the mmW frequency band. This may increase the latency. Spectrum efficiency may be improved. PDDCCH and PDDDCH may be multiplexed in both time and frequency domains to balance between TDM and FDM. FIG. 6 illustrates multiplexing of dedicated Physical Downlink Directional Control Channel (PDDCCH) and Physical Downlink Directional Data Channel (PDDDCH)

The mmW downlink data enhancement may be unidirectional, e.g., in the downlink direction. mmW control information in the uplink may be carried in LTE uplink control or data channels. Duplex schemes, such as frequency division duplex (FDD), time division duplex (TDD), and/or spatial division duplex (SDD) may be utilized.

Multiple access may depend on the beamforming technique and may vary within a beam (e.g., intra-beam) or between beams (e.g., inter-beam). Advanced baseband transmit beamforming may be used at the SCmB. Analog receive beamforming may be used at the mWTRU.

Intra-beam multiple access may involve scheduling multiple mWTRUs in a downlink transmit beam. For example, frequency division multiple access (FDMA) may involve multiple mWTRUs assigned with different frequency allocation and receiving simultaneously. The mWTRUs may receive a strong downlink signal in similar angular incoming directions. The best beam for one mWTRU may not be the best beam for another mWTRU. A jointly configured (e.g., optimized) beam (e.g., suboptimal for all) may be used. The SCmB may schedule an mWTRU within a beam.

Time division multiple access (TDMA) may involve multiple mWTRUs assigned with frequencies allocated in the transmit beam. For example, in a slot, there may be one mWTRU receiving. In such a case, a suboptimal beam may not be used. However, the packet size may be comparatively large that may lead to packing inefficiencies.

Non-orthogonal multiple access (NOMA) may involve multiple mWTRUs located at a distance from each other in the transmit beam and a large path loss difference. The mWTRUs may use the same frequency and time resources, e.g., non-orthogonal, but may use superposition coding and successive interference cancellation (SIC) to remove the interfering signal successively. The channel estimation for an mWTRU may use a more complex design.

Inter-beam multiple access may involve scheduling multiple mWTRUs in different downlink transmit beams. Spatial division multiple access (SDMA) may involve multiple mWTRUs assigned in different transmit beams. The mWTRUs may be allocated with identical frequency resources and may receive simultaneously (e.g., MU-MIMO). Receive beamforming may use interference rejection combining (IRC). FDMA may involve multiple mWTRUs assigned in different transmit beams allocated with different frequency resources. TDMA may involve multiple mWTRUs assigned in different transmit beams assigned with identical frequency resources and receiving in turn according to scheduling. This may be similar to intra-beam TDMA.

An mWTRU may use a phase antenna array to achieve an antenna gain for compensating for the high path loss at mmW frequencies, at which the short wavelength may allow a compact form factor of the device design. While an element spacing of 0.5λ may be used in theoretical performance analysis, in practice a larger spacing, such as 0.7λ, may be applied.

Figure 7:
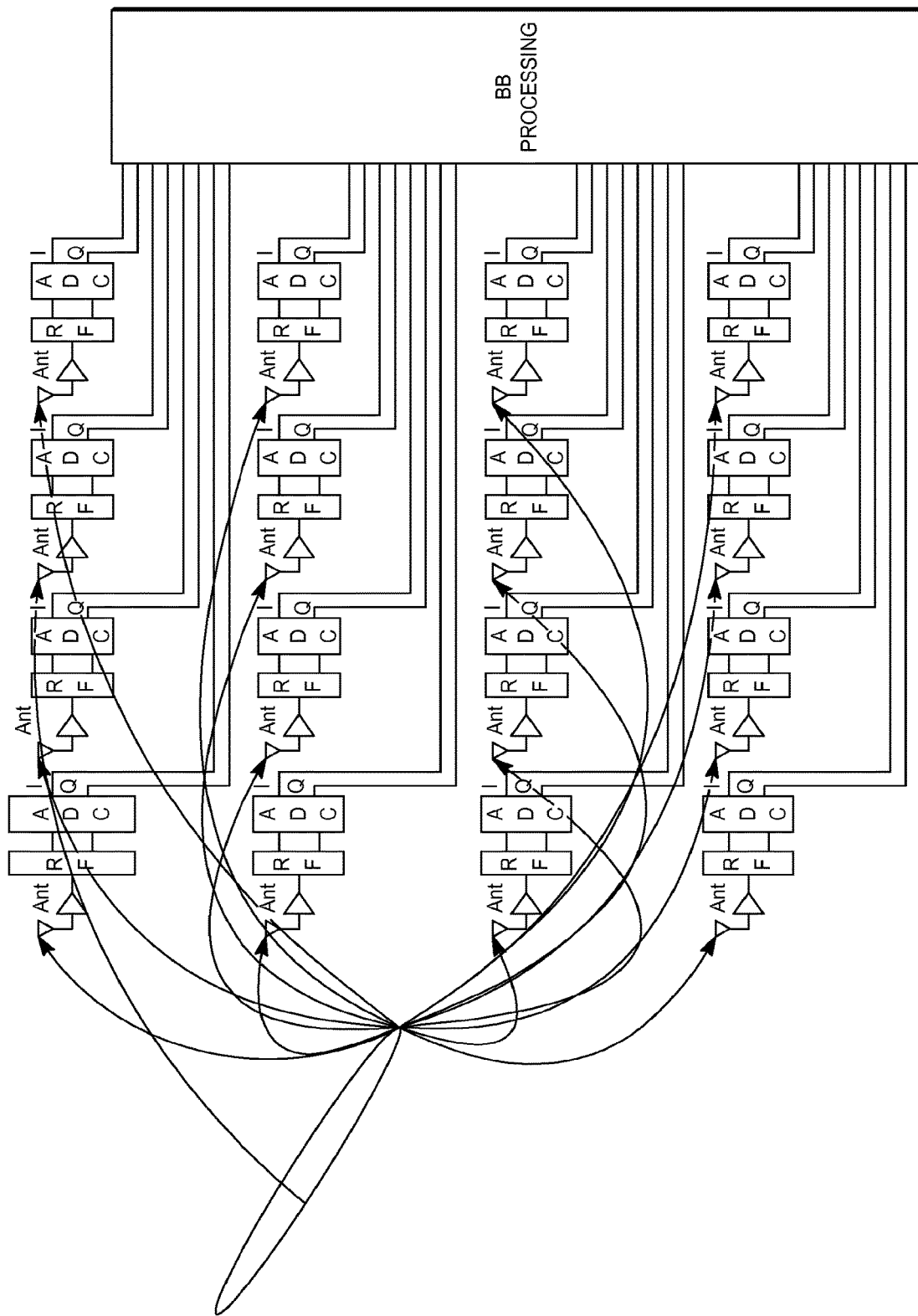
FIG. 7 illustrates an example of digitized beamforming in an mmW WTRU (mWTRU).

An antenna element may have a dedicated RF chain, which may include RF processing and analog-to-digital conversion (ADC) as illustrated in FIG. 7. The signal processed by an antenna element may be controlled independently in phase and/or amplitude to configure (e.g., optimize) the channel capacity. While this mWTRU antenna configuration may provide very high performance, it may have a high cost and complexity in implementation and high energy consumption in operation.

An mWTRU may employ a hybrid approach in which analog beamforming may be performed over phase array elements associated with a phase shifter and connected to an RF chain. The phase of the signal at an antenna element may be adjusted in the beamforming. Digital precoding may be applied on the baseband signals of one or more RF chains (e.g., all RF chains) when there is more than one RF chain. Spatial diversity and MIMO schemes may be implemented using digital precoding.

System parameters of hybrid beamforming may include a number of data streams $N_{DATA}$, a number of RF chains (TRX) $N_{TRX}$, a number of antenna ports $N_{AP}$, a number of antenna elements $N_{AE}$, and/or a number of phase antenna arrays $N_{PAA}$.

In an example, $N_{PAA}$ may be less than or equal to $N_{AP}$ that may be less than or equal to $N_{TRX}$ that in turn may be less than or equal to $N_{AE}$. A PAA may include multiple antenna elements. For example, a 4×4 PAA may have 16 antenna elements. An antenna port may be defined such that the channel over which a symbol on the antenna port is conveyed may be inferred from the channel over which another symbol on the same antenna port is conveyed. One resource grid per antenna port may be provided. Cell-specific reference signals may support a configuration of one, two, or four antenna ports and may be transmitted on antenna ports p=0, p∈{0,1} and p∈{0,1,2,3}, respectively. Multicast-broadcast single-frequency network (MBSFN) reference signals may be transmitted on antenna port p=4. mWTRU-specific reference signals associated with physical downlink shared channel (PDSCH) may be transmitted on one or more antenna ports p=5, p=7, p=8, or one or more of p∈{7,8,9,10,11,12,13,14}. Demodulation reference signals associated with enhanced physical downlink control channel (EPDCCH) may be transmitted on one or more of antenna ports p∈{107,108,109,110}. Positioning reference signals may be transmitted on antenna port p=6. CSI reference signals may support a configuration of one, two, four, or eight antenna ports and may be transmitted on antenna ports p=15, p∈{15,16}, p∈{15,16,17,18}, and p∈{15,16,17,18,19,20,21,22}, respectively. An antenna port may carry a beamformed reference signal associated with the antenna port that may be used to identify the antenna port.

Figure 8:
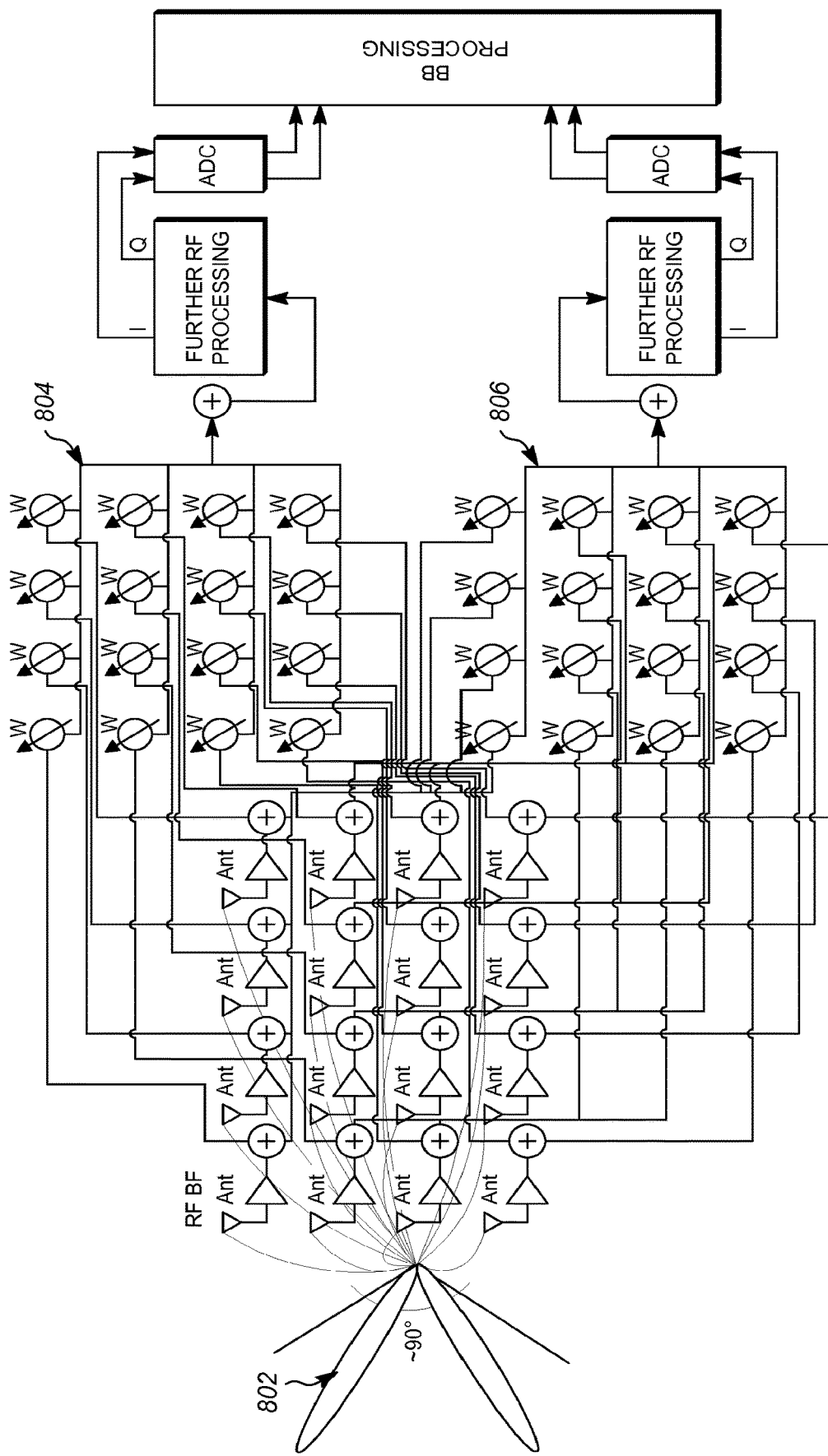
FIG. 8 illustrates an example of a phased antenna array (PAA) connected to two RF chains.

A phase antenna array (PAA) may be connected to one or more RF chains, depending on the system requirement and/or configuration. FIG. 8 illustrates a PAA 802 that may be connected to RF chains 804, 806. The PAA 802 may be of a size 4×4. The RF chains 804, 806 may have sets of 16 phase shifters. The PAA 802 may form two beam patterns within a +45° and −45° coverage in the azimuth plane. In this configuration, $N_{PAA} < N_{AP} = N_{TRX} < N_{AE}$.

Figure 9:
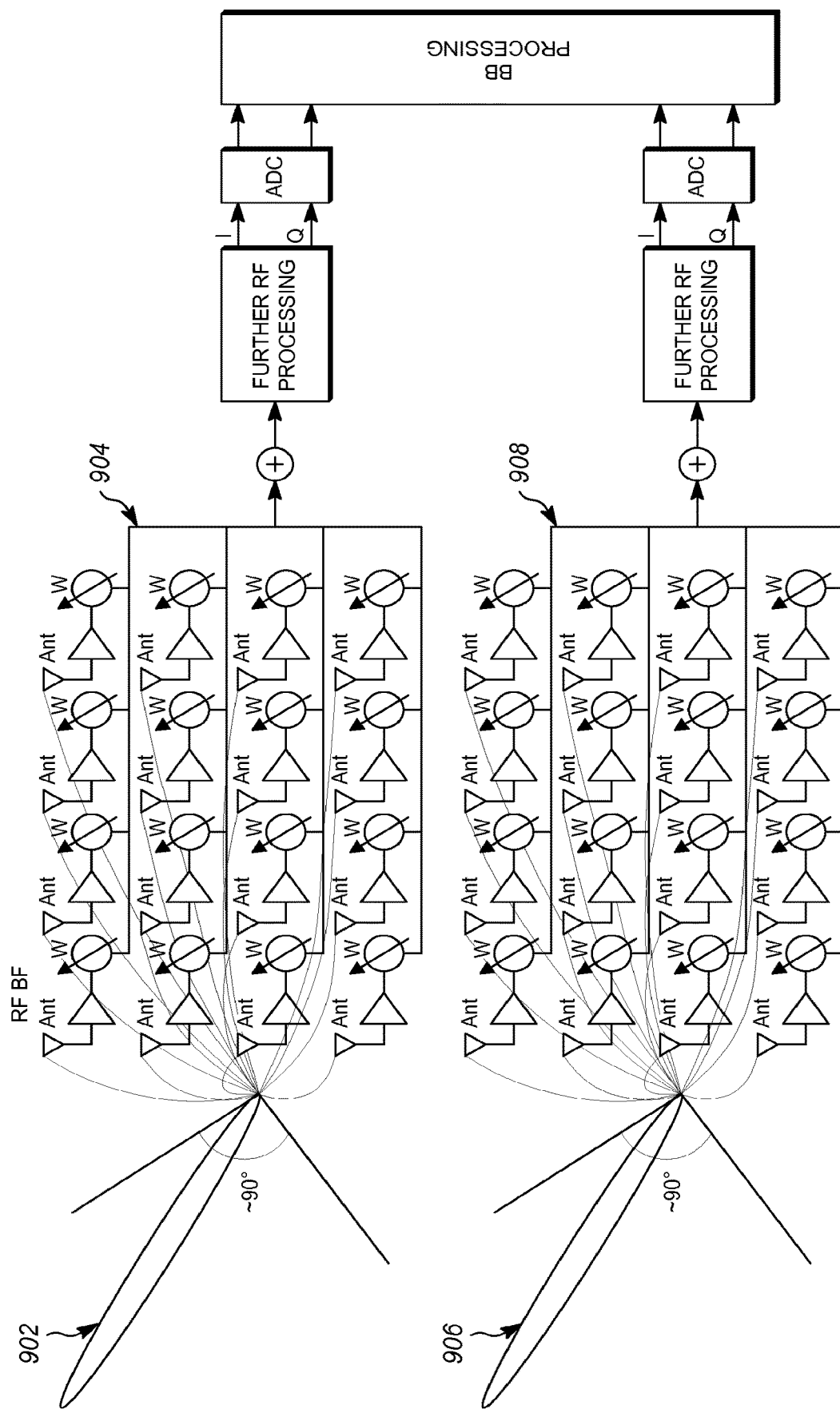
FIG. 9 illustrates an example of a PAA connected to its respective RF chain.

FIG. 9 illustrates a PAA 902 connected to an RF chain 904 and a PAA 906 connected to an RF chain 908. For example, PAAs 902, 906 may have dedicated RF chains. As illustrated in FIG. 9, the number of phase antenna arrays, $N_{PAA}$, the number of antenna ports $N_{AP}$, the number of RF chains (TRX) $N_{TRX}$, and the number of antenna elements $N_{AE}$ may be related as: $N_{PAA} = N_{AP} = N_{TRX} \leq N_{AE}$. Such an example may allow a spatial independence between the two simultaneous beams by placing the PAAs 902, 906 at different orientations, e.g., in the azimuth plane. An aligned PAA arrangement may provide an aggregated larger coverage compared to the configuration in FIG. 8. The antenna configuration may be fully digitized and may be comparable to the configuration shown in FIG. 7, e.g., when the number of TRX is equal to the number of antenna elements (e.g., one RF chain per antenna element).

Figure 10:
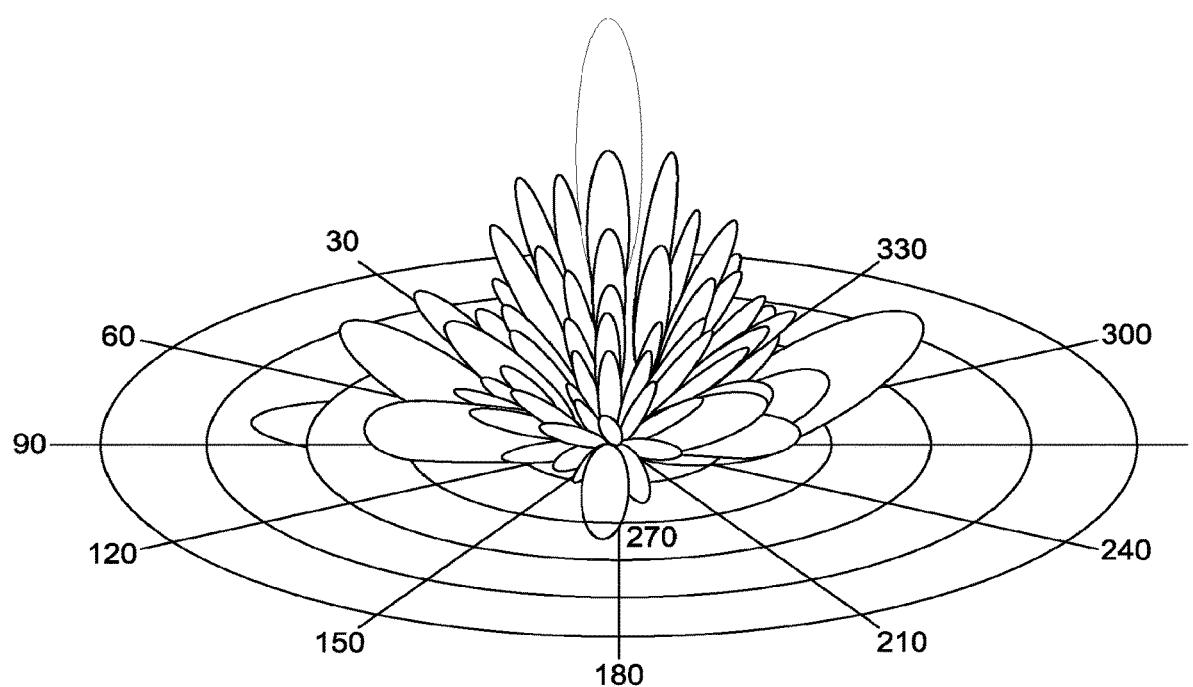
FIG. 10 illustrates an exemplary narrow beam pattern.

In an example, $N_{DATA} \leq N_{TRX} \leq N_{AE}$. When $N_{DATA} = N_{TRX} = 1$, an mWTRU may have a single-beam configuration and may operate one beam at a time. The mWTRU beamforming may form a narrow beam pattern, as illustrated in FIG. 10, at an angular direction, e.g., the strongest angular direction, e.g., a LOS path estimated from beam measurement.

Figure 11:
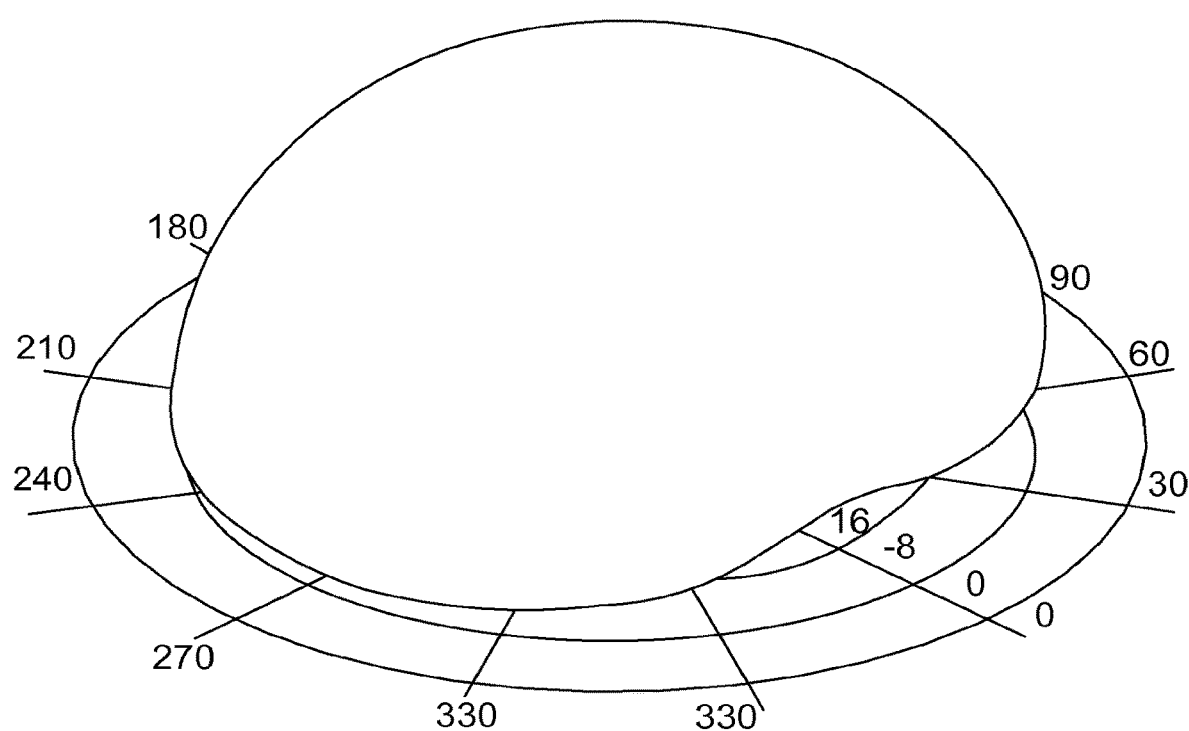
FIG. 11 illustrates an exemplary broad beam pattern.

The mWTRU may form a broad beam pattern having a wide main lobe, an example of which is illustrated in FIG. 11, to cover a range of continuous angular directions including strong and weak ones in between. The antenna gain may be reduced when forming a broad pattern, and the link budget may become worse.

Figure 12:
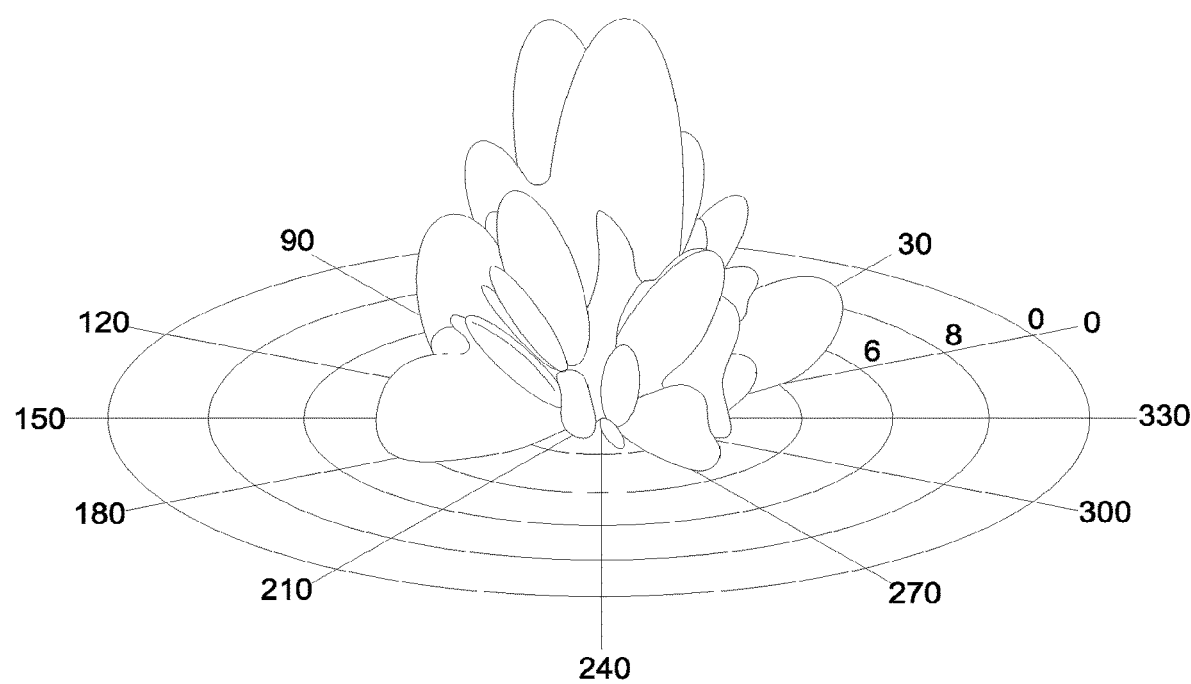
FIG. 12 illustrates an exemplary multiple beam pattern.

The mWTRU may adaptively form a beam pattern with multiple distinct strong lobes, an example of which is illustrated in FIG. 12, to receive at two or more different incoming angular directions. Multiple transmit beams may be directed, for example, at multiple strong specular reflection paths to take advantage of spatial diversity. The forming of this beam pattern may reduce the antenna gain compared to a narrow beam pattern. The adaptive beam pattern may use a beamforming algorithm to have continuous steering and forming capability to dynamically adjust the beam pattern in response to the estimated channel conditions.

When $N_{DATA} = 1 < N_{TRX}$, for example, when $N_{TRX} = 2$, an mWTRU may have two simultaneous beam patterns and the beam patterns may be different and used for different applications. The mWTRU may place two narrow beam patterns at different angular incoming directions to utilize spatial diversity and mitigate the blockage effect and/or weak LOS condition. This may facilitate beam combining. The mWTRU may place two narrow beam patterns at different angular incoming directions and may apply a fast beam switching mechanism when one beam's channel conditions deteriorate, e.g., quickly. The mWTRU may form a narrow beam and a broad beam for different applications. For example, the narrow beam may be used for traffic, and the broad beam may be used for control signaling.

When $1 < N_{DATA} = N_{TRX}$, the transmission may apply MIMO to increase the capacity, for example, in high SNR channel conditions. The mWTRU may place two narrow beam patterns at different angular incoming directions to receive two data streams. The mWTRU analog beamforming algorithms may include fixed codebook-based beamforming and/or eigenvalue-based beamforming.

In fixed codebook-based beamforming, a grid of beams may include a set of fixed beams. A beam may be formed by the mWTRU applying a beamforming vector v chosen from a predefined codebook v∈{$v_1, v_2, v_3 \ldots v_N$}, where N may denote the number of fixed beams. Each vector may include pre-calibrated phase shifts for phase shifters and may represent an analog beam direction, e.g., a beam. The number of beams may depend on the half-power-beam-width (HPBW) and desired coverage.

Eigenvalue-based beamforming may involve a precoding applied eigenvalue-based weight vector based on short-term channel information. The algorithm may perform well in scenarios with increased multipath and high angular spread and low mWTRU mobility. Such beamforming may provide the adaptive beamforming capability to track channel conditions.

Small cell mmW base station (SCmB) beamforming schemes may include fixed beam, adaptive beamforming, e.g., codebook-based and non-codebook-based, and classical beamforming, e.g., DoA estimation. A scheme may use different procedures. For example, the DoA estimation may use a smaller angular spread, and an mWTRU may transmit an LTE band uplink reference signal for AS range estimation to provide DoA accuracy. The fixed beam system may use beam cycling and beam switch mechanisms.

A legacy (e.g., LTE) WTRU antenna configuration may have an omnidirectional radiation pattern with an antenna gain of 0 dBi. Such antenna configuration may be used in RAN1/RAN4 system and link simulation for evaluation of various technologies, including, e.g., release 12 (R12) 3D MIMO/beamforming. The WTRU antenna beam may be fixed at a wide beam width, e.g., 120° with a maximum 3 dBi gain in elevation and 0 dBi in azimuth. The WTRU may receive a downlink beamformed physical downlink shared channel (PDSCH) with the help of a physical downlink control channel (PDCCH) carrying information including antenna port, number of layers, scrambling identity, etc. The associated demodulation reference signal (DMRS) may be WTRU-specific and may be beamformed along with data symbols.

SCmB and mWTRU may form highly directional and narrow beam patterns to provide beamforming gain, for example, to overcome the significant path loss experienced by the mmW channels and to meet the link budget for the SCmB deployment. The mmW control information may be transmitted and received within a beam pair. The dedicated nature of the control signaling due to the spatial isolation may involve a different control signaling and data scheduling than may be used in some LTE systems. Systems, methods, instrumentalities may be provided to receive mmW scheduling information in paired mmW narrow beam patterns, e.g., from narrow-beam-common PDDCCH and/or dedicated PDDCCH to PDDDCH.

An SCmB and one or more mWTRUs may operate in LTE and mmW frequency bands. Such SCmB and mWTRUs may use the mmW frequency band for data, e.g., transmit data in mmW narrow beam patterns. Such SCmB and mWTRUs may apply a cross-system scheduling, e.g., schedule mmW data via LTE downlink channels. The mmW DCI carried in LTE channels may include dynamic per-TTI scheduling information.

Control signaling and scheduling design may take into account multiple design issues, including the timing difference between the two systems, the inequality of TTI lengths of the two systems, and/or the LTE scheduling mechanism. Procedures may use LTE channels to schedule PDDDCH, e.g., from PDCCH/EPDCCH/PDSCH to PDDDCH.

Carrying dynamic per-TTI mmW DCI in LTE channels may reduce cross-system scheduling efficiency due to operation difference between the two systems. To better utilize the LTE channel resources, the SCmB may use LTE channels for relatively static mmW DCI and may transmit PDDCCH in mmW narrow beams to convey the dynamic per-TTI mmW DCI. The design may use coordination and sequencing of the mmW DCI over different LTE channels and PDCCH. Procedures may apply such a multi-stage cross-system scheduling, e.g., from PDCCH/EPDCCH/PDSCH to dedicated PDDCCH to PDDDCH.

An SCmB may form an mmW broad beam pattern to carry control information (e.g., layer one (L1) control information) for mWTRUs associated with an mmW cell or sector. mWTRU receive beam may receive a downlink broad beam in a configured beam position. A broad beam may carry control information for one or more users. The signaling associated with control information may be multiplexed. Systems, methods, instrumentalities may be provided to an mWTRU to detect and/or receive control signaling from a downlink mmW broad beam pattern, e.g., broad beam PDDCCH to PDDDCH.

Millimeter wave (mmW) downlink control information (mDCI) may include mWTRU beam scheduling and dynamic per-beam pair structure configuration information. mDCI signaling may carry control information that may be used for the downlink mmW data scheduling, e.g., information used for an mWTRU to locate, demodulate, and/or decode the PDDDCH.

Millimeter wave downlink control information (mDCI) may include transmit and receive beam scheduling information. Such scheduling information may be used for an mWTRU to identify transmit and/or receive beam to be used for the scheduled data transmission. The information may be signaled, for example, using an antenna port number or a beam identification number or may be derived, for example, from a code assignment, such as BSRS index. An SCmB scheduler may assign mmW data to an mWTRU, for example, based on channel measurements specific to a receive beam and a LTE channel measurement. For example, channel quality indication (CQI) may not be associated with a receive beam that is used for the measurement. The network at the transmitter may have information regarding the available options for the receive beam. Since the receiver orientation may alter, a receiver beam may be specified in global coordinates rather than relative to the mWTRU orientation, for example, by compensating via use of gyros, compasses, and the like. This beam-specific scheduling information may be carried in a common PDDCCH or a dedicated PDDCCH or an LTE channel, for example, depending on the control signaling design.

Millimeter wave downlink control information (mDCI) may include dynamic frame structure configuration information. The time slot or subframe configuration for downlink and uplink allocation may be altered (e.g., dynamically altered) to adapt to the downlink and uplink traffic load. This configuration may be per beam pair, e.g., between an SCmB and an mWTRU. A plurality of (e.g., two) beam pairs may use different time division duplex (TDD) configurations without downlink-to-uplink and/or uplink-to-downlink interference between the beam pairs, for example, because of spatial isolation that may be provided due the narrow beam pairing.

Figure 13:
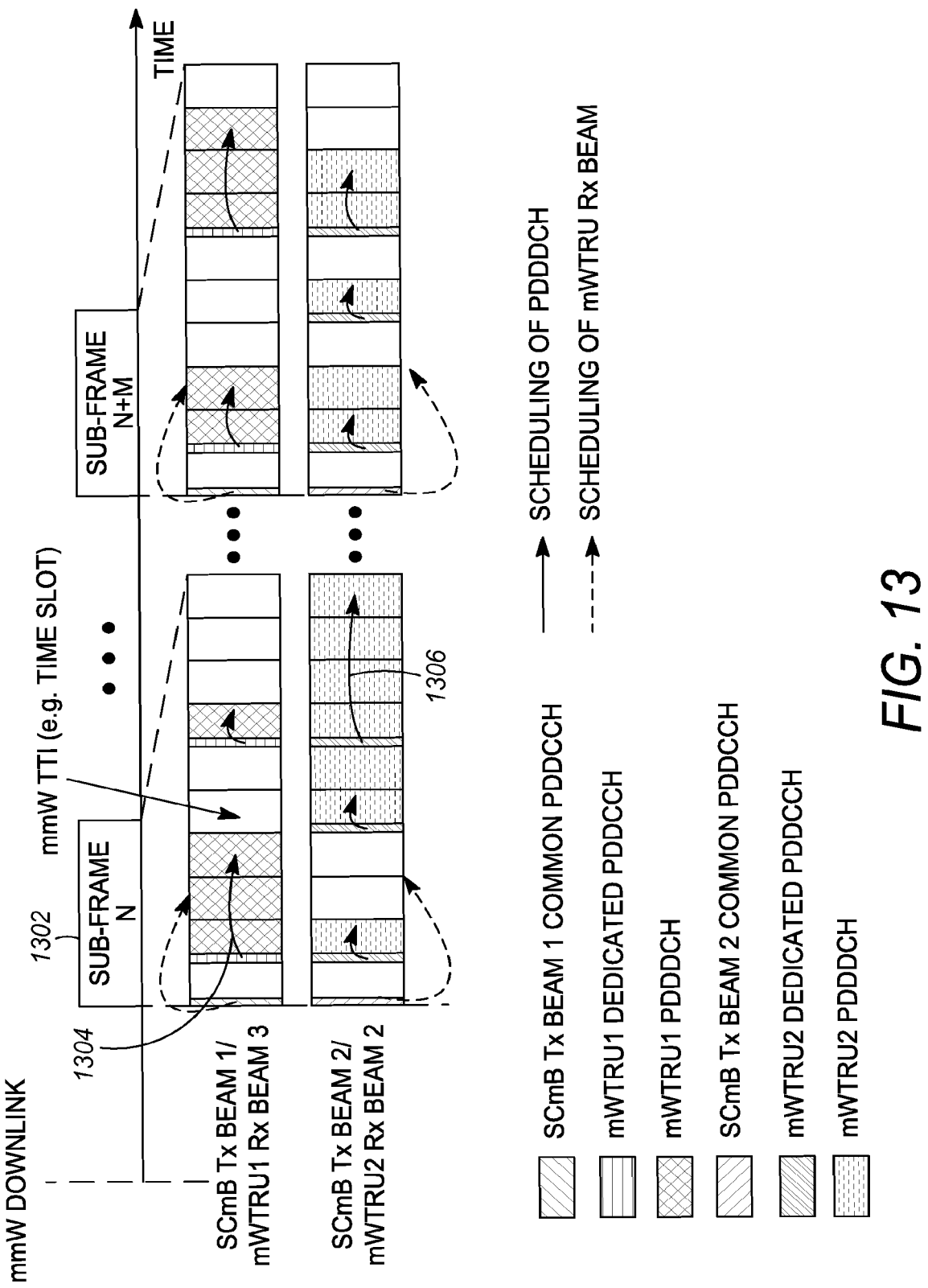
FIG. 13 illustrates an example of dynamic predictive scheduling per beam pair.

Millimeter wave downlink control information (mDCI) may include scheduling duration information. FIG. 13 illustrates examples of dynamic predictive scheduling per beam pair (e.g., between SCmB transmit (Tx) Beam 1 and mWTRU Rx Beam 3, and between SCmB Tx Beam 2 and mWTRU Rx Beam 2). As illustrated in FIG. 13, the number of mmW TTIs scheduled in a PDDCCH may vary, for example, using predictive scheduling. The SCmB may configure (e.g., predictively configure) multiple consecutive TTIs in a beam pair to be scheduled at one time. The configuration of multiple consecutive TTIs may depend on the channel condition. For example, in case of SCmB Tx Beam 1/mWTRU Rx Beam 3 beam pair, for sub-frame N 1302, three consecutive TTIs (1304) may be configured, whereas, in case of SCmB Tx Beam 2/mWTRU Rx Beam 2 beam pair, for sub-frame N 1302, four consecutive TTIs (1306) may be configured. The number of the consecutive TTIs may be conveyed in the dynamic frame structure configuration information carried in the dedicated PDDCCH. For example, a scheduling validity period value indicating the number of consecutive TTIs. The multiple TTI configuration may save signaling overhead. Because of the exclusive nature of the dedicated PDDCCH, the interference between different mWTRUs may be eliminated.

Millimeter wave downlink control information (mDCI) may include PDDDCH frequency resource allocation information. For example, the PDDDCH frequency resource allocation may include location of the frequency resource that the PDDDCH applies, e.g., RBs in the OFDM-based system or carrier indicator in the SC-based system. The number of bits used may depend on one or more factors including the system bandwidth, scheduling granularity, etc. Localized or distributed allocation may be considered. The mmW channel within the narrow beam may not have as much frequency selectivity as the distributed allocation may exploited, e.g., as in the LTE channel. The DMRS associated with the PDDDCH may be placed in the allocated region according to a pre-standardized pattern.

Millimeter wave downlink control information (mDCI) may include PDDCCH frequency resource allocation information. For example, the PDDCCH frequency resource allocation information may include the location of the frequency resource that the PDDCCH applies. This may be similar to PDDDCH frequency resource allocation when PDDCCH and PDDDCH are time-multiplexed in an mmW narrow beam as shown in FIG. 6. PDDCCH may be placed separately in an mmW broad beam. The allocation of PDDCCH may be pre-standardized without explicit real-time signaling in a similar way as how PDCCH operates.

Millimeter wave downlink control information (mDCI) may include code assignment information. For example, the code assignment information may include configuration of BSRS sequence index or scrambling code index that an mWTRU may use to detect and/or demodulate the BSRS and/or data transmission. The scrambling code may be used on PDDDCH or PDDCCH.

Millimeter wave downlink control information (mDCI) may include carrier indicator information. Within a beam pair, the mmW data transmission may use carrier aggregation. An mWTRU may receive scheduling information applicable to a different SC-based or OFDM-based carrier than the one that carries the control information.

Millimeter wave downlink control information (mDCI) may include information associated with the modulating and coding scheme, such as the transport format of the data transmitted in the scheduled TTI, including information relating to a coding rate and modulating scheme. A set of predefined MCS values corresponding specific coding rates and modulation schemes may be used, for example, in the form of an MCS table.

Millimeter wave downlink control information (mDCI) may include data indication information that may indicate whether the scheduled TTI has a new data transmission or a retransmission. mDCI may include redundancy version information that may identify which redundancy version of a retransmission is carried in the scheduled TTI. The redundancy version may be applied in an incremental redundancy retransmission scheme.

Millimeter wave downlink control information (mDCI) may include information relating to the number of layers. An mmW data transmission may include multiple layers to utilize multiple input multiple output (MIMO) application along with beamforming. A mWTRU may de-map the data from different layers based on this information.

Millimeter wave downlink control information (mDCI) may include a channel state information request. The SCmB may request channel state information, including channel quality indicator (CQI), precoding matrix indicator (PMI), rank indicator (RI), etc. The CQI measurement may be beam specific and based on BSRS. The SCmB may transmit specific CSI-RS in the frequency allocation in the beam. Such a beam may not be used for the data or for scheduling purpose. The CQI may be wide band or subband.

Millimeter wave downlink control information (mDCI) may include a beam-specific measurement request. The SCmB may request a quality measurement specific to a certain transmit beam for scheduling purpose. An associated beam measurement occasion may be configured explicitly in this request or may be implicitly indicated based on configurations signaled beforehand, for example, in SIB. The beam specific measurement may be an analog measurement as opposed to a digital signal-to-noise ratio (SNR)-based CQI measurement. For example, an mWTRU may detect energy at a specific frequency resource to determine the strength of a beam. The beam quality measurement may be a layer 1 (L1) measurement and feedback mechanism that provide real-time beam-specific information.

Millimeter wave downlink control information (mDCI) may include mmW UCI resource allocation. The uplink resource may be allocated implicitly for mmW uplink channel state information or other reporting of measurement. The association between a downlink mmW transmission and the UCI resource allocation may be realized in, for example, the specific beam information, frequency resource allocation, code assignment, etc.

Certain scheduling information, such as beam scheduling, may be provided for long-term. The decoding of the long-term scheduling information may be periodic or triggered by certain predefined events. These events may include, for example, degradation of beam strength or SINR, a higher layer command, and/or consistent measurement of a better beam pair for the mmW sector.

Periodic and configured mWTRU receive narrow beam cycling may be used to detect mmW sector BSRS. Such receive beam cycling may also be used to read common PDDCCH for mmW segment identity for two-dimensional beam-specific measurement of beam signal strength or beam signal-to-interference-plus-noise ratio (SINR) metrics.

Millimeter wave downlink control information (mDCI) transmission may vary, e.g., based on the control signaling and/or scheduling procedure design. The control signaling and scheduling procedure design may be based on the transmit beam configuration and/or the receive beam configuration, the cooperation between LTE and mmW systems, etc.

Transmission of one or more DCI parameters may be conveyed, for example, depending on the system design. Certain DCI parameters may be transmitted differently from others and may have different application in each scheduling instance.

Millimeter wave downlink control information (mDCI) transmission for an mWTRU may be carried out in a physical layer channel or sequentially in multiple (e.g., two) physical layer channels. For example, a dedicated PDDCCH may carry per-TTI scheduling information including MCS. The per-TTI scheduling information may be applied to an associated PDDDCH without beam specific information. A common PDDCCH may be used by an mWTRU to identify the beam and extract the dedicated PDDDCH. A portion of the mmW DCI may be carried in higher layer signaling.

Figure 14:
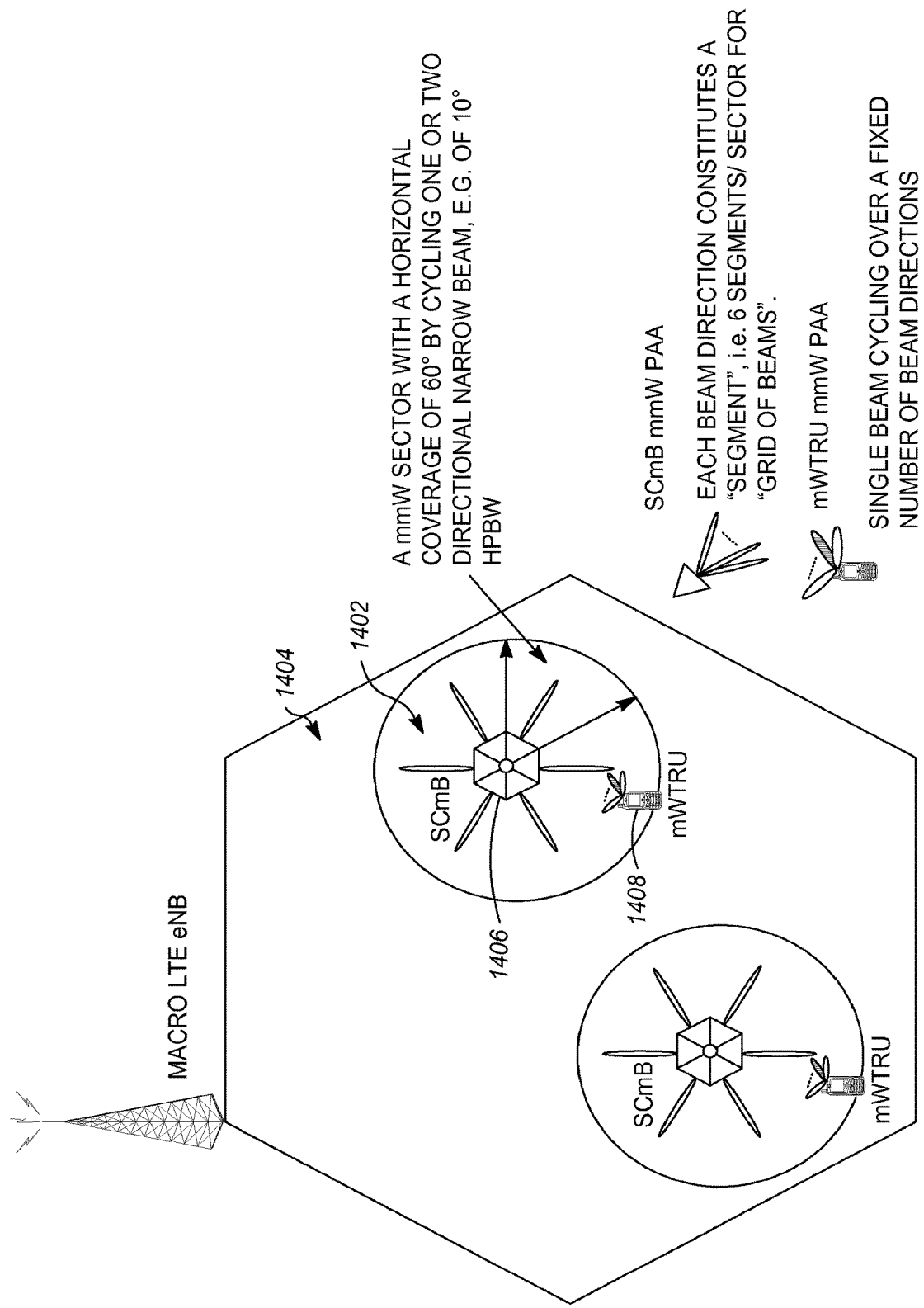
FIG. 14 illustrates an exemplary mmW system with a fixed narrow beam pattern.

Systems, methods, and/or instrumentalities provided here related to mmW beam transmission may apply to the mmW system. FIG. 14 illustrates an exemplary mmW system with fixed narrow beam pattern. As illustrated in FIG. 14, an SCmB 1406 may overlay an mmW coverage onto the LTE small cell coverage 1402, e.g., provided by an omnidirectional antenna. The small cell coverage 1402 may be located within a broad beam system, e.g., a macro LTE sector 1404. The mmW coverage may be implemented by using, for example, six mmW PAAs. Each of the PAAs may be used with one or more narrow beams of, for example, 10° horizontal beam width. The number of simultaneous SCmB beams within an mmW sector may be limited due to hardware complexity and cost. For example, six beam directions that may be considered as a segment, when an SCmB operates a fixed beam system with a narrow beam of 10° half power bandwidth (HPBW) in a mmW sector. The SCmB may cycle the narrow beam in the segments according to certain configurations, including pattern, periodicity, power, etc.

As illustrated in FIG. 14, mWTRU 1408 may attach to SCmB 1406 using an LTE CS procedure, e.g., based on the best LTE cell. mWTRU 1408 and receive mmW-specific configuration, e.g., via an SIB. The received configuration may include configuration regarding timing offset between an LTE downlink reference and mmW subframe timing. The mWTRU 1408 may align the mmW reception using the timing offset and the detected LTE downlink reference timing from primary synchronization signal (PSS) and/or secondary synchronization signal (SSS) and common reference signal (CRS).

The received configuration may include configuration regarding mmW sector BSRS code indices that may identify each mmW sector. For example, the BSRS may use a pseudorandom sequence, such as a Zadoff-Chu (ZC) sequence with good auto- and cross-correlation properties and with good performance against timing and frequency offsets. In the case of a ZC sequence, sector sequences may be generated based on a ZC base sequence specific to the SCmB.

The received configuration may include configuration regarding mmW segment BSRS code indices. Such configuration may identify an mmW segment within an identified sector. The mmW segment identity may be encoded in a control field following BSRS, for example, using three bits to represent up to eight identities in a common PDDCCH.

The received configuration may include configuration regarding a frequency resource that may be used for the sector BSRS, segment BSRS, and/or the common PDDCCH within the narrow beam. The received configuration may include configuration regarding subframe, periodicity, transmission pattern, and/or other configuration parameters of the sector, segment BSRS, and/or the common PDDCCH.

The received configuration may include configuration regarding time domain resources, for example, symbol location, time slot or subframe of the BSRS, and dedicated PDDCCH transmission within the narrow beam.

The received configuration may include configuration regarding periodicity, power, and/or a pattern of the SCmB beam cycling over the mmW segments within an mmW sector. For example, the system frame number (SFN) in which the downlink beam is at a sector and the duration in terms of subframes at the position may be signaled to mWTRUs. The power of the beam may be used to estimate the path loss of a segment. In an SFN cycle, an SCmB may dedicated a number of consecutive subframes to cycle over the segments for beam-specific measurement.

The received configuration may include configuration regarding periodicity, pattern, and/or other configuration parameters of the mWTRU beam cycling. The received configuration may include configuration regarding the common PDDCCH transport configuration parameters, for example, the information payload and transport format of the control fields carried in the channel.

One or more mmW BSRS configuration parameters may be applicable to multiple mmW sectors of SCmBs. An mWTRU may detect mmW sectors that are not co-located with the SCmB to which the mWTRU is attached.

An mWTRU may perform a cycling procedure to provide beam measurement at an mWTRU receive beam position for scheduling or other purposes. The mWTRU may form an mmW narrow receive beam according to the cycling pattern, periodicity, and/or other configuration parameters. The other configuration parameters may be determined according to the mWTRU capability and/or signaling from the network.

The sector BSRS and segment BSRS may be correlated. The sector BSRS and segment BSRS may be detected according to the BSRS configuration. The duration at an mWTRU receive beam direction may be derived from the duration of the SCmB beam at a segment. For example, with the duration of an mWTRU receive beam direction, the SCmB may have a cycling of beams over the segments within an mmW sector. The mmW sector and segment to detect and measure at a receive beam direction may be requested and/or configured by the network. For example, an mWTRU may be configured to use a subset of receive beam directions and mmW segments for subsequent measurement. As illustrated in Table 2 below, the network may request and configure beam-specific measurements for the beam pairs whose measurement metric is higher than 15 (e.g., as represented by bold entries).

TABLE 2

| mWTRU Rx Beam\Segment | 1 | 2 | 3 | 4 | 5 | 6 |
|---|---|---|---|---|---|---|
| 1 | 1 | 1 | 1 | 2 | 1 | 1 |
| 2 | 5 | 6 | 6 | 7 | 6 | 6 |
| 3 | 12 | 18 | 22 | 23 | 22 | 17 |
| 4 | 10 | 12 | 15 | 16 | 11 | 9 |
| 5 | 4 | 5 | 6 | 6 | 6 | 5 |
| 6 | 1 | 1 | 2 | 1 | 1 | 1 |

The mWTRU may synchronize in timing and frequency with the strongest BSRS that may belong to its associated SCmB. The mWTRU may synchronize with the strongest BSRS from a non-co-sited mmW sector, e.g., if there is no BSRS strong enough to be detected. The mWTRU may report zero or no metric at this receiver beam direction, e.g., if no BSRS is detected.

The mWTRU may demodulate and decode the common PDDCCH. The mWTRU may obtain the mmW segment identity. The common PDDCCH may apply a predefined transport format. The common PDDCCH reading may involve the segment identity field that may be accessible for all mWTRUs.

The segment identity may not be explicitly encoded in a data format, but may be embedded in an mmW segment reference signal that may be of the same type as the mmW sector BSRS. The mWTRU may correlate the segment BSRS. The mWTRU may identify the segment BSRS and synchronize further with the segment BSRS. The mmW sector and segment BSRS may be aligned in time according to a predefined relationship. The sequence generation may be based on the sector and segment identifiers assigned by the network.

The mWTRU may denote the measured signal strength (e.g., analog measurement) and/or SNR of the identified mmW sector and/or segment for this specific receive beam. The metric may be quantized to integer values according to a predefined table. This information may be on a per-receive-beam basis as illustrated in Table 2 with a beam configuration of six segments per mmW sector and six receive beam positions of an mWTRU. The example may assume a metric table ranging from 1 (e.g., minimum SINR or beam strength) to 32 (e.g., maximum SINR or beam strength).

The mWTRU may report the measured mmW segment metric at an mWTRU receive beam direction to the network. This receive beam cycling and measurement of an mmW sector and segment may provide the network with the information for mmW sector association and data scheduling. The reporting may include the beam-specific measurement results as illustrated in Table 2.

The mWTRU may report the measurement metric whose values are above a preconfigured threshold. For example, Table 3 illustrates a threshold-based measurement with a threshold of 10. The reporting may only include beam-specific measurements of the mWTRU receive beam 3 and 4 and for receive beam 4 only mmW segments 2 to 5.

TABLE 3

| mWTRU Rx Beam\Segment | 1 | 2 | 3 | 4 | 5 | 6 |
| --- | --- | --- | --- | --- | --- | --- |
| 1 | | | | | | |
| 2 | | | | | | |
| 3 | 15 | 18 | 22 | 23 | 22 | 20 |
| 4 | | 12 | 15 | 16 | 11 | |
| 5 | | | | | | |
| 6 | | | | | | |

A periodic and selectively-configured beam cycling and measurement may provide input to the scheduling procedure. The mmW DCI may include beam allocation information. The scheduled mWTRU may place the receive beam accordingly and may synchronize with the BSRS without searching for a transmit beam.

An mmW narrow-beam-common PDDCCH may be used for long-term scheduling of an mWTRU receive beam. A dedicated PDDCCH may be used for per-TTI dynamic scheduling of PDDDCH. The mmW narrow beam pattern transmitted by an SCmB may carry PDDCCH and PDDDCH.

Per-TTI mmW data scheduling information may be carried in a dedicated PDDCCH. The transmit and receive beam scheduling information may be carried in a common PDDCCH. The transmit and receive beam scheduling information may be intended for one mWTRU per beam. An mWTRU may detect its beam scheduling information of the common PDDCCH using an WTRU specific identity information, e.g., international mobile subscriber identity (IMSI)/cell radio network temporary identifier (C-RNTI)/mmW radio network temporary identifier (mmW-RNTI) scrambled cell-specific reference signal (CRS) and/or payload may be scrambled with the identity information as provided above.

An mWTRU may begin with a periodic or requested beam cycling as disclosed herein. Configuration parameters may be used for the initial beam acquisition, such as transmit beam cycling periodicity, number of transmit beams, transmit beam BSRS code index, etc.

Figure 15:
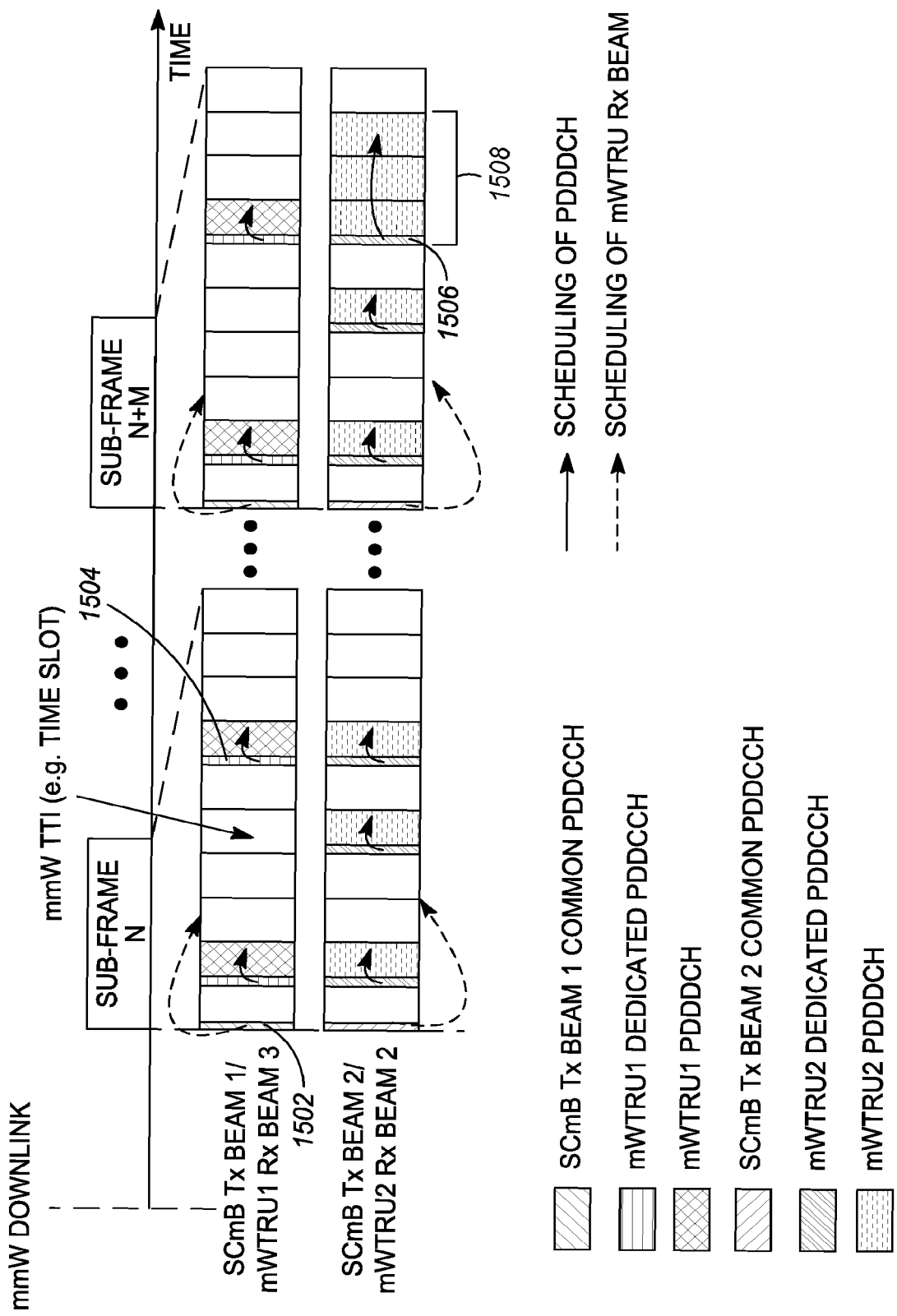
FIG. 15 illustrates an example of a common physical directional downlink control channel (PDDCCH) and a dedicated PDDCCH scheduling of a physical downlink directional data channel (PDDDCH).

The mWTRU may cycle its coverage and may detect transmit beams, e.g., mmW segments, at a receive beam direction (e.g., each receive beam direction). The transmit beam that carries the data transmission may have mWTRU-specific information in the common PDDCCH, e.g., the mWTRU's C-RNTI, mmW-RNTI, or other identity. The mWTRU may detect a transmit beam at a receive beam direction. The mWTRU may decode the common PDDCCH. The mWTRU may detect the scheduling and may start the data transmission. The per-TTI scheduling data may be obtained from the dedicated PDDCCH, as illustrated in FIG. 15. The mWTRU may receive transmit and/or receive beam scheduling information in the common PDDCCH and the dynamic per-TTI scheduling information in the dedicated PDDCCH.

As illustrated in FIG. 15, a mWTRU (e.g., mWTRU1) may form an mmW narrow receive beam. The mWTRU may form an mmW narrow receive beam according to the cycling pattern, periodicity, and/or other configuration parameters. The other configuration parameters may be determined according to the mWTRU capability and/or signaling from the network. The receive beam forming may be based on an event-triggered monitoring of the common or dedicated PDDCCH for upcoming scheduling instances or a periodic cycling for measurement and scheduling monitoring.

The mWTRU may correlate and detect sector BSRS. The mWTRU may subsequently segment BSRS according to the BSRS configuration. The duration at an mWTRU receive beam direction may be derived from the duration of the SCmB beam at a segment. For example, with the duration of an mWTRU receive beam direction, the SCmB may have a cycling of beams over the segments within an mmW sector.

The mWTRU may synchronize in timing and frequency with the strongest BSRS that may belong to its associated SCmB. If no such BSRS is found, the mWTRU may synchronize with the strongest BSRS from a non-co-located mmW sector.

The mWTRU may demodulate and decode the common PDDCCH (e.g., SCmB Tx Beam 1 common PDDCCH 1502 related to mWTRU1). The mWTRU may obtain the mmW segment identity. The common PDDCCH may apply the predefined transport format. Segment identity in the common PDDCCH may be read by one or more mWTRUs, e.g., all mWTRUs.

The mWTRU may correlate and detect the segment BSRS and may synchronize with the detected segment BSRS.

The mWTRU may demodulate and decode the common PDDCCH or the dedicated PDDCCH to determine whether the mWTRU is scheduled for a segment. The mWTRU may also determine the identification of the received beam the mWTRU may use. The field of the common PDDCCH carrying the information associated with the identification of the received beam and whether a mWTRU is scheduled for a segment may be encoded with the scheduled mWTRU's identity, for example, C-RNTI, mmW-RNTI, or IMSI. The encoding may be realized in CRC scrambling and/or payload scrambling.

The mWTRU may form the schedule receive beam at the scheduled direction and may demodulate and decode the dedicated PDDCCH (e.g., dedicated PDDCCH 1504) for the dynamic per-TTI scheduling information such as MCS and NDI. The resource allocation of common and dedicated PDDCCH may be signaled by the network via higher layer signaling, for example, in system information block (SIB).

The mWTRU may read the validity period for a scheduling instance and may apply the validity period accordingly to consecutive mmW TTIs. As illustrated in FIG. 15, dedicated PDDCCH (e.g., dedicated PDDCCH 1506 related to mWTRU2) may carry scheduling information that may be applicable to a number of consecutive mmW TTIs 1508. The mWTRU may demodulate and decode the associated PDDDCH (e.g., 1508) with the help of DMRS according to the scheduling information received in the dedicated PDDCCH.

Figure 16:
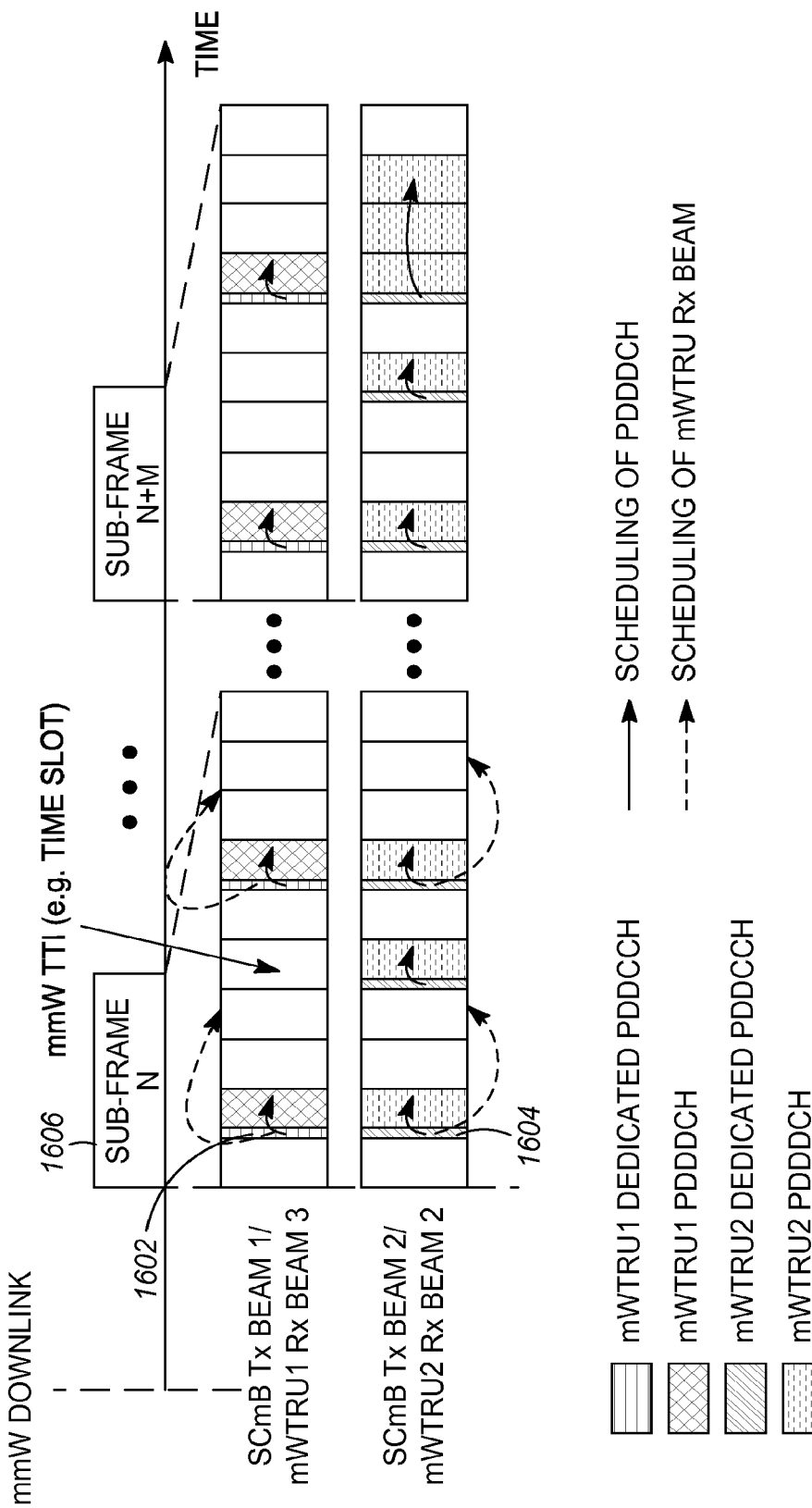
FIG. 16 illustrates an example of dedicated PDDCCH-only scheduling of PDDDCH.

Dedicated PDDCCH only scheduling of PDDDCH may be provided. FIG. 16 illustrates and example of such scheduling. As illustrated in FIG. 16, the beam scheduling information may be included in dedicated PDDCCH (e.g., dedicated PDDCCH scheduling 1602 for mWTRU1 and dedicated PDDCCH scheduling 1604 for mWTRU2) in an mmW subframe n 1606. The data scheduling may not involve the common PDDCCH. The beam scheduling information may be repeated, e.g., when an mWTRU may continue data transmission within a same beam pair.

The scheduling information used for a TTI within a transmit/receive beam pair, based on channel condition, may be suitable for one or more TTIs (e.g., consecutive TTIs). One dedicated PDDCCH may be used to schedule a number of consecutive PDDDCHs, e.g., TTIs. This type of dynamic frame structure may be per beam pair and may change from subframe to subframe, as illustrated in FIG. 13.

The mmW DCI in the dedicated PDDCCH may carry a control field to indicate the validity period in terms of a number of TTIs during which the same scheduling information may apply. The mWTRU may not attempt to decode the dedicated PDDCCH in the subsequent TTIs, as the entire TTI length may be occupied by the PDDDCH. This may save control signaling overhead, and such configuration may vary in a beam pair and due to the spatial isolation between beam pairs, no interference may arise from this configuration. The validity period may vary depending on the channel condition of a beam pair.

LTE physical downlink control channel (PDCCH) and/or enhanced PDCCH (EPDCCH) may be used for long-term scheduling of an mWTRU beam and mmW PDDDCH over multiple mmW TTIs. DCI fields may be utilized to indicate associated TTI numbers. The mmW narrow beam pattern transmitted by a SCmB may carry PDDDCH, e.g., and no common or dedicated PDDCCH. The mmW data may be scheduled using LTE L1 channels.

An LTE DCI format may be used to carry the mmW DCI information. The LTE DCI format may include mDCI fields as disclosed herein. The mDCI fields may include one or more of: transmit and receive beam scheduling, dynamic frame structure configuration, scheduling duration, PDDDCH and its DMRS frequency resource allocation, PDDDCH DMRS code assignment, carrier indicator, modulation and coding scheme, new data indication, redundancy version, number of layers, channel state information request, beam-specific measurement request, or mmW UCI resource allocation.

The LTE DCI may include a scheduling TTI number. The mmW TTI length may be significantly less than the LTE TTI length of 1 ms. A PDCCH may schedule a number of mmW TTIs. Predictive scheduling may be applied to schedule consecutive TTIs. In either case, the LTE DCI may include a field for the scheduling TTI number to associate the scheduling information with an mmW TTI to be scheduled.

The LTE DCI may include mmW UCI processing information. The network may configure how to process the multiple ACKs/NACKs associated with the scheduled PDDDCH transmission, the beam specific measurement, and/or other mmW uplink control information per mmW TTI. Such information may be processed (e.g., bundled and/or multiplexed) by an mWTRU, and transmitted in LTE physical uplink control channel (PUCCH). The mmW UCI processing information may be used to signal the type of processing the mWTRU may use.

An mWTRU may monitor PDCCH, e.g., as specified in LTE standards. The mWTRU may detect the mmW DCI carried in its PDCCH using its C-RNTI and may decode the scheduling information. The mWTRU may receive one set of scheduling information for an mmW TTI. The timing offset between the downlink LTE reference subframe timing and mmW subframe timing may allow adequate time to decode the mmW DCI.

Figure 17:
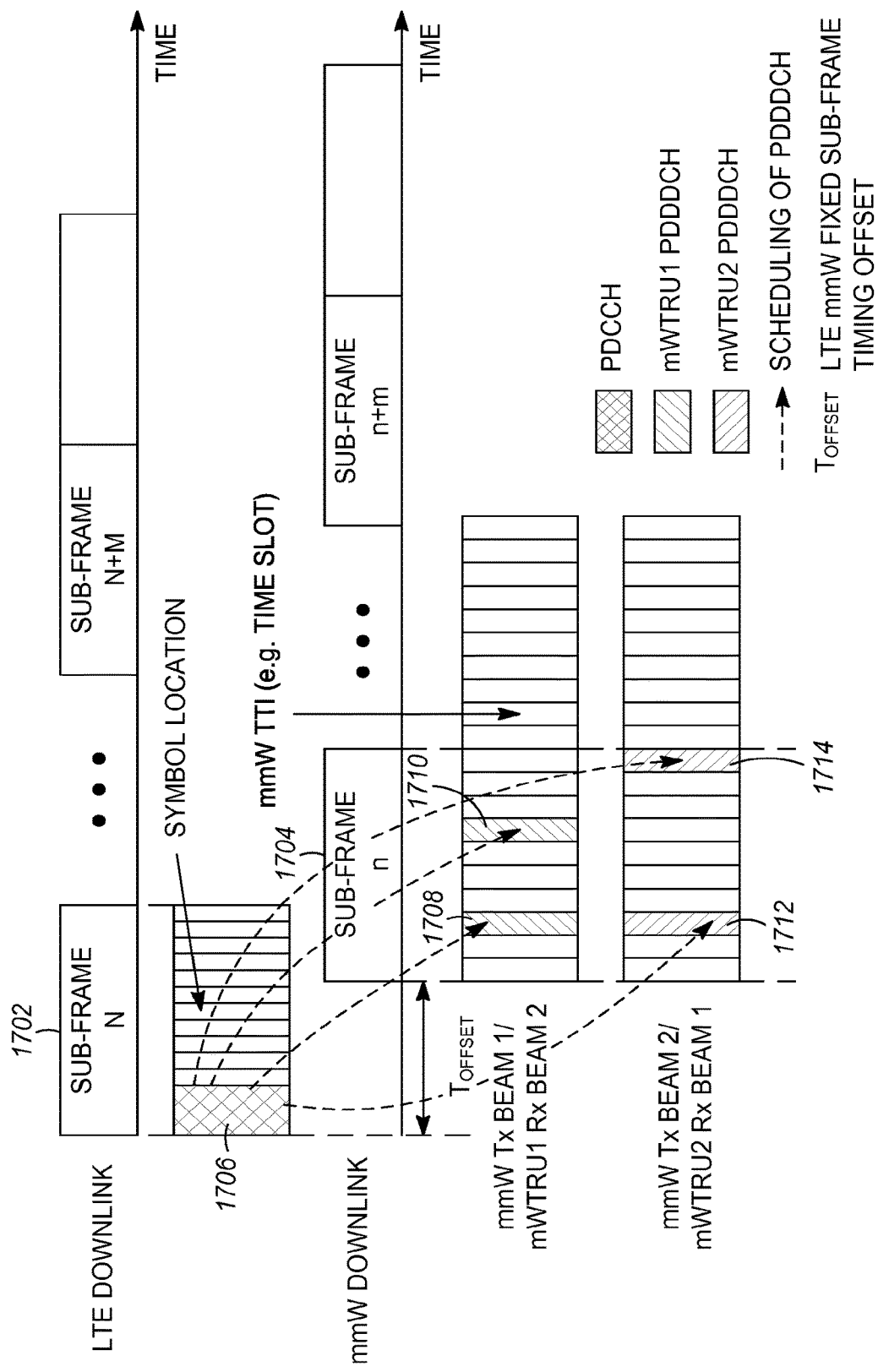
FIG. 17 illustrates an example of physical downlink control channel (PDCCH) scheduling of PDDDCH.

FIG. 17 illustrates an example of PDCCH scheduling of PDDDCH. As illustrated in FIG. 17, an mWTRU (e.g., mWTRU1) may form the receive beam according to the scheduled receive beam information and may align the mmW subframe receiving timing according to the LTE subframe start timing and a predefined timing offset. The decoded PDCCH 1706 in LTE subframe N 1702 may be applied in mmW subframe n 1704. N may be equal or unequal to n. N may equal n, for example, when both LTE subframe and mmW subframe are 1 ms. As illustrated in FIG. 17, one LTE PDCCH 1706 may schedule multiple mmW TTIs, for example, depending on the length of the mmW TTI. For example, mmW TTI may be 100 μs and one mmW sub-frame may include 10 mmW TTIs. Accordingly, one PDCCH may schedule up to 10 mmW TTIs.

The mWTRU may correlate and detect an mmW sector BSRS and may subsequently segment BSRS according to the scheduled BSRS configuration. The mWTRU may subsequently synchronize its timing and frequency based on the reference signals.

The mWTRU may demodulate and decode a scheduled TTI according to the TTI number and associated scheduling information in the mmW DCI. As illustrated in FIG. 17, the mWTRU mWTRU1 may use the scheduling information from one PDCCH 1706 in LTE subframe N 1702 to receive TTI 2 1708 and TTI 6 1710 in mmW subframe n 1704. The mWTRU mWTRU2 may receive scheduling information in TTI2 1712 and TTI9 1714.

Figure 18:
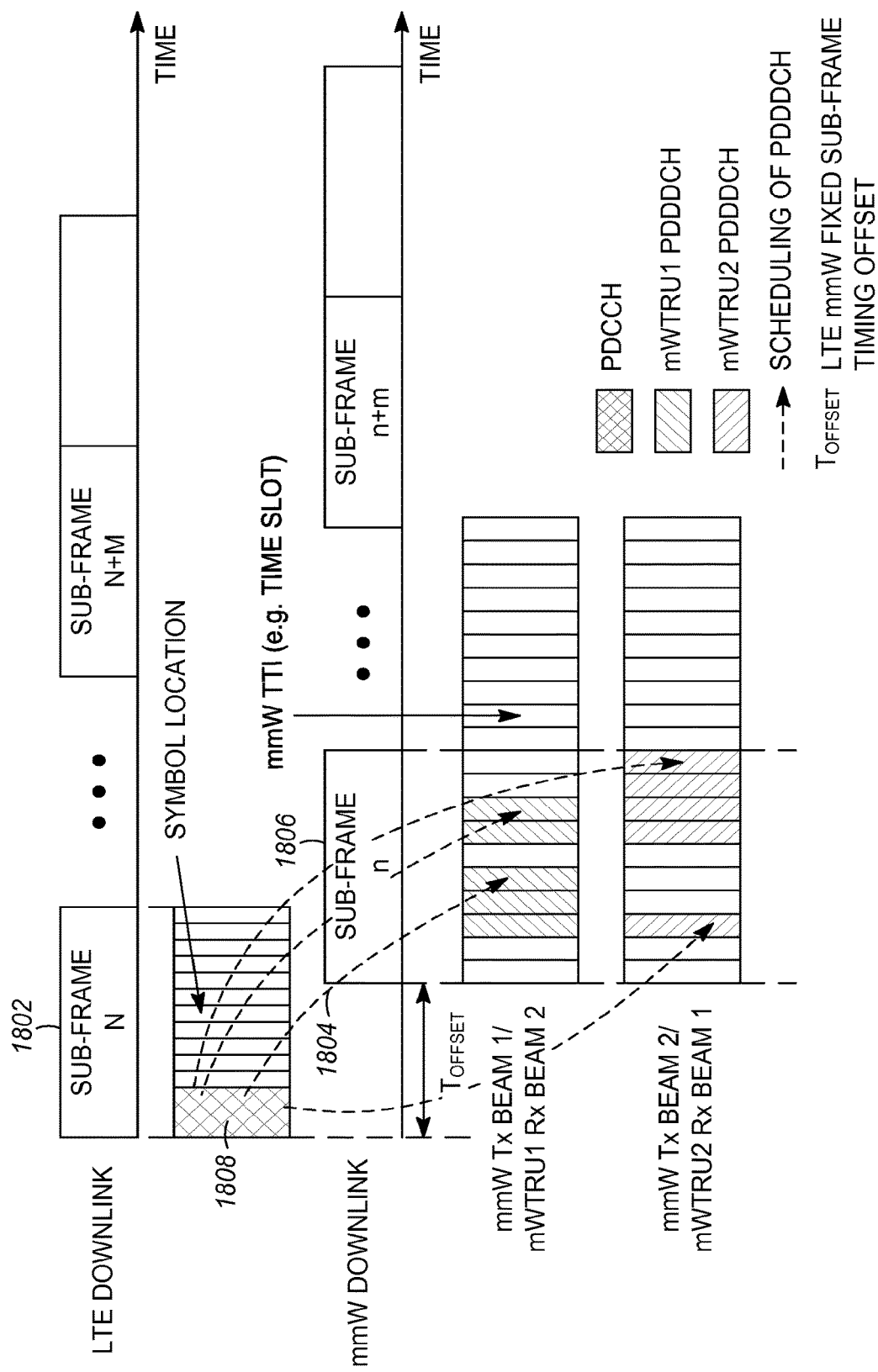
FIG. 18 illustrates an example of PDCCH scheduling of PDDDCH over multiple transmission time intervals (TTIs).

The mWTRU may read the validity period for each scheduling instance and apply the validity period accordingly to consecutive mmW TTIs. An LTE PDCCH may carry, for example, multiple scheduling information each applicable to a number of consecutive mmW TTIs. FIG. 18 illustrates an example of PDCCH 1808 (e.g., in LTE subframe N 1802) scheduling of PDDDCH over multiple TTIs (e.g., in mmW subframe n 1806). As illustrated in FIG. 18, an mWTRU mWTRU1 may receive one set of scheduling information 1804 for TTIs TTI2, TTI3 and TTI4. The LTE PDCCH 1808 in LTE subframe N 1802 may carry two sets of scheduling information for four sets of mmW TTIs. A similar procedure may be applied by an mWTRU when enhanced PDCCH (EPDCCH) is applied to schedule the mmW PDDDCH.

Figure 19:
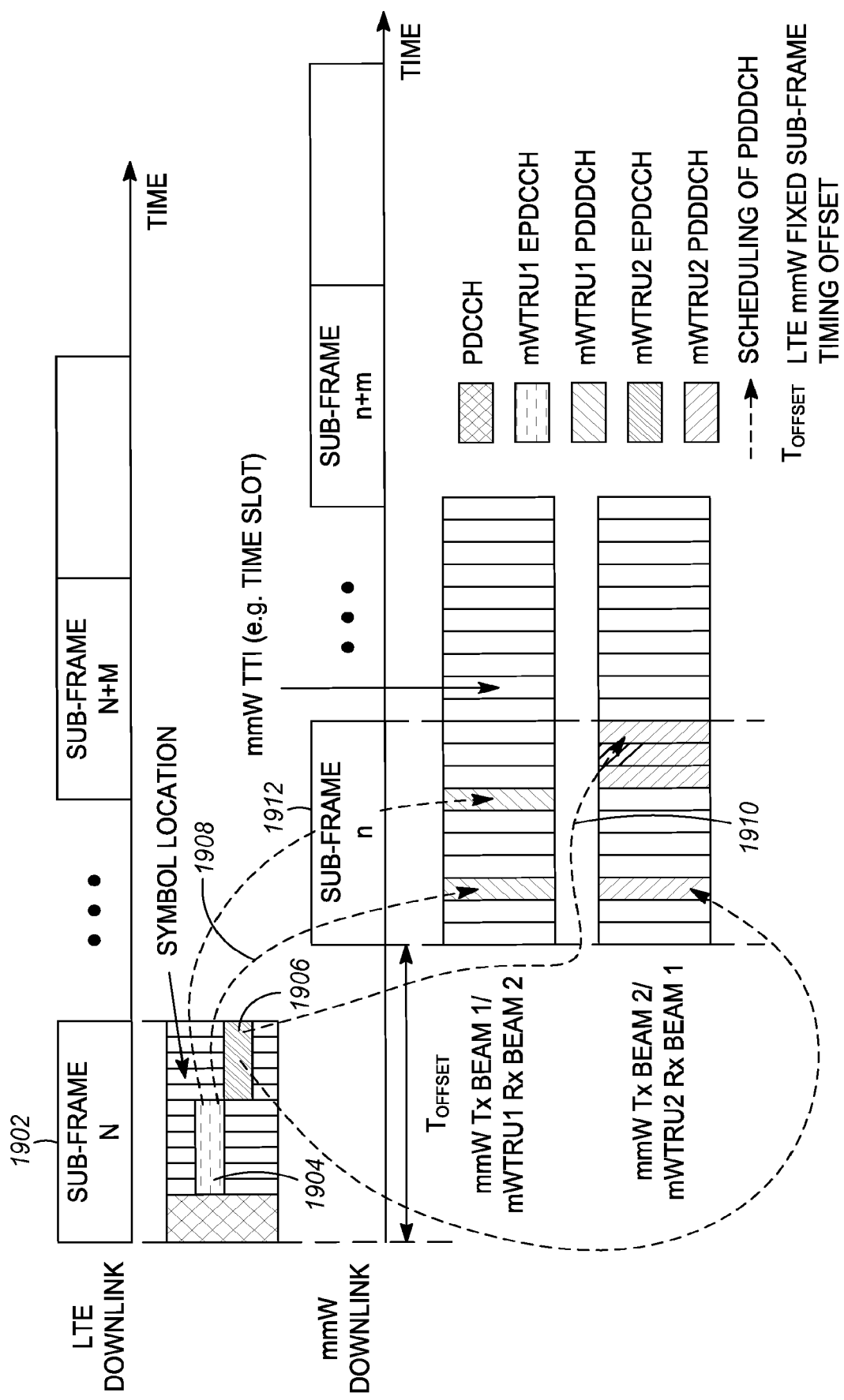
FIG. 19 illustrates an example of enhanced physical downlink control channel (EPDCCH) scheduling of PDDDCH.

FIG. 19 illustrates an example of EPDCCH scheduling of PDDDCH. As illustrated in FIG. 19, first EPDCCH 1904 (e.g., in LTE subframe N 1902) may carry scheduling information 1908 of PDDDCH related to mWTRU1 (e.g., in mmW subframe n 1912). As illustrated in FIG. 19, a second EPDCCH 1906 may carry scheduling information 1910 of PDDDCH related to mWTRU2.

LTE millimeter wave physical downlink control channel (mmPDCCH) dynamic per-TTI scheduling of mWTRU beam and PDDDCH may be provided. The per-TTI scheduling may be provided by PDCCH or detected by blind-decoding. A downlink LTE control physical channel, mmPDCCH, may transmit mmW scheduling information dynamically on a per-mmW-TTI basis, for example, to cope with the impact of the inequality of LTE and mmW TTI. An mmPDCCH may be transmitted at each downlink LTE symbol location that has a one-to-one mapping to the mmW TTI to be scheduled. The mmPDCCH transmitted in symbol N may schedule the PDDDCH transmission in time slot N of the upcoming mmW subframe.

In an LTE downlink frame structure there may be thirteen symbol locations among which two or three symbols may be used for PDCCH. An LTE subframe may have 10 mmPDCCH for one mWTRU. Multiple mmPDCCHs may be located at the same symbol location for the scheduling of multiple mWTRUs.

The mDCI disclosed herein may be encoded in the mmPDCCH. The mmPDCCH may have dedicated resources for its mWTRU that may be scheduled by PDCCH or that may have a multiplexed structure that may involve blind decoding of mWTRUs.

For an mWTRU to decode an mmPDCCH, an LTE DCI specific to mmPDCCH may be used. The DCI may be used to schedule an L1 control channel. The mmPDCCH DCI per mWTRU may include, for example, a symbol location, a frequency resource allocation (e.g., PRB assignment), a modulation and coding scheme (e.g., may be predefined and not included in mmPDCCH DCI), a demodulation reference signal configuration, and/or an uplink millimeter wave physical uplink control channel (mmPUCCH) configuration (e.g., an associated mmW UCI transmission). The mDCI carried in the mmPDCCH may apply the fields disclosed herein.

Figure 20:
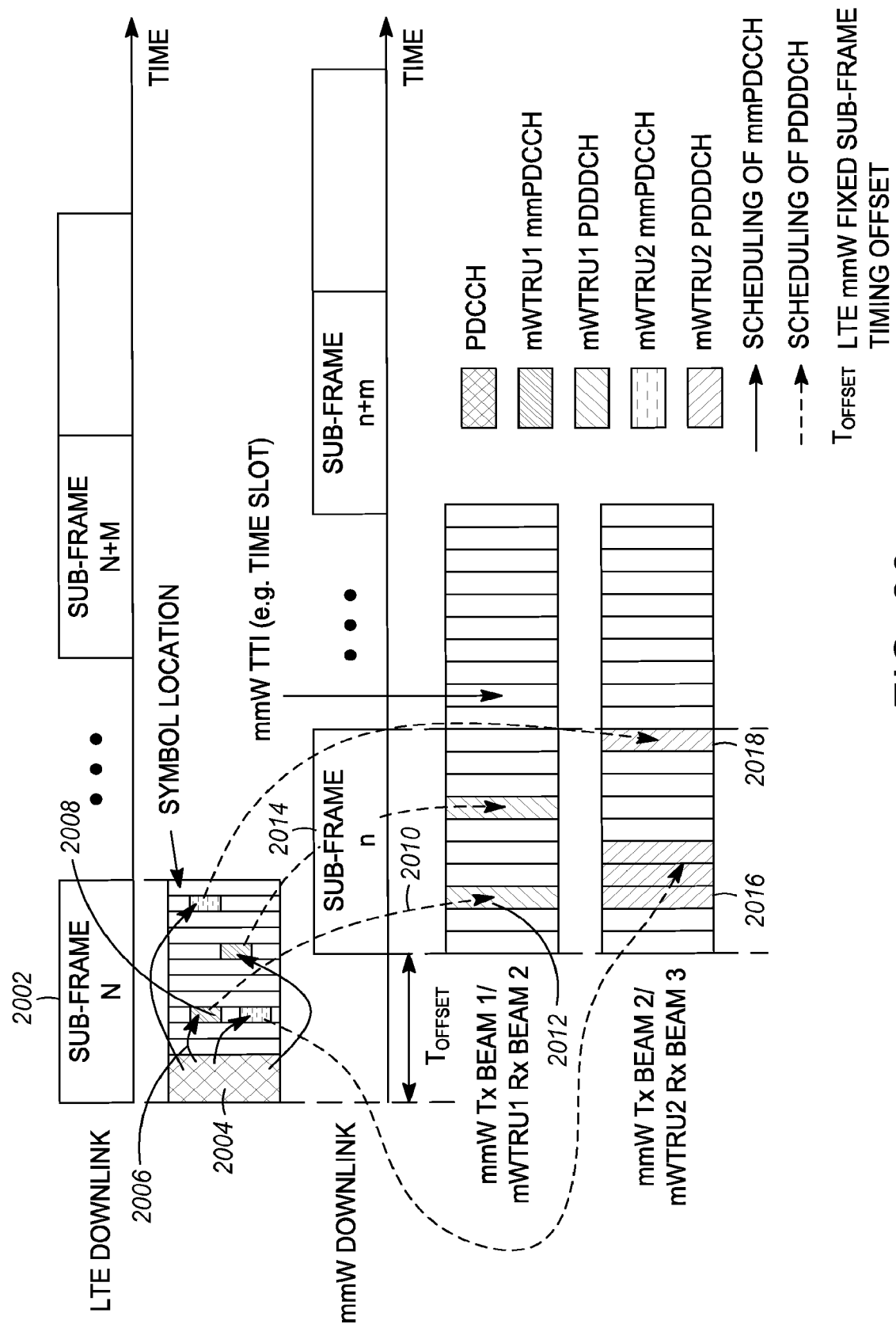
FIG. 20 illustrates an example of dedicated mmW PDCCH (mmPDCCH) scheduling of PDDDCH.

FIG. 20 illustrates an example of dedicated mmPDCCH scheduling of PDDDCH. An mWTRU may monitor PDCCH 2004 (e.g., in an LTE sub-frame N 2002). As illustrated in FIG. 20, in a dedicated mmPDCCH (e.g., mmPDCCH 2006 related to mWTRU1), the mWTRU mWTRU1 may detect mmPDCCH specific LTE DCI carried in its PDCCH 2004 using its C-RNTI and may decode information for receiving its upcoming mmPDCCH 2006. The mmPDCCH specific LTE DCI may include mmPDCCH symbol location 2008, frequency resource, transport format, and/or other configuration parameters. The mmPDCCH 2006 may carry scheduling information 2010 related to PDDDCH 2012 of mWTRU1 (e.g., in subframe n 2014).

The mWTRU may locate and decode the mmPDCCH in the schedule symbol location of the same LTE TTI. As the mWTRU signaled by the PDCCH (e.g., only the mWTRU signaled by the PDCCH) may read the mmPDCCH, no blind decoding may be necessary at the symbol location. The mmPDCCH may carry mDCI, including, for example, the beam allocation, BSRS, PDDDCH resource allocation, etc.

Figure 21:
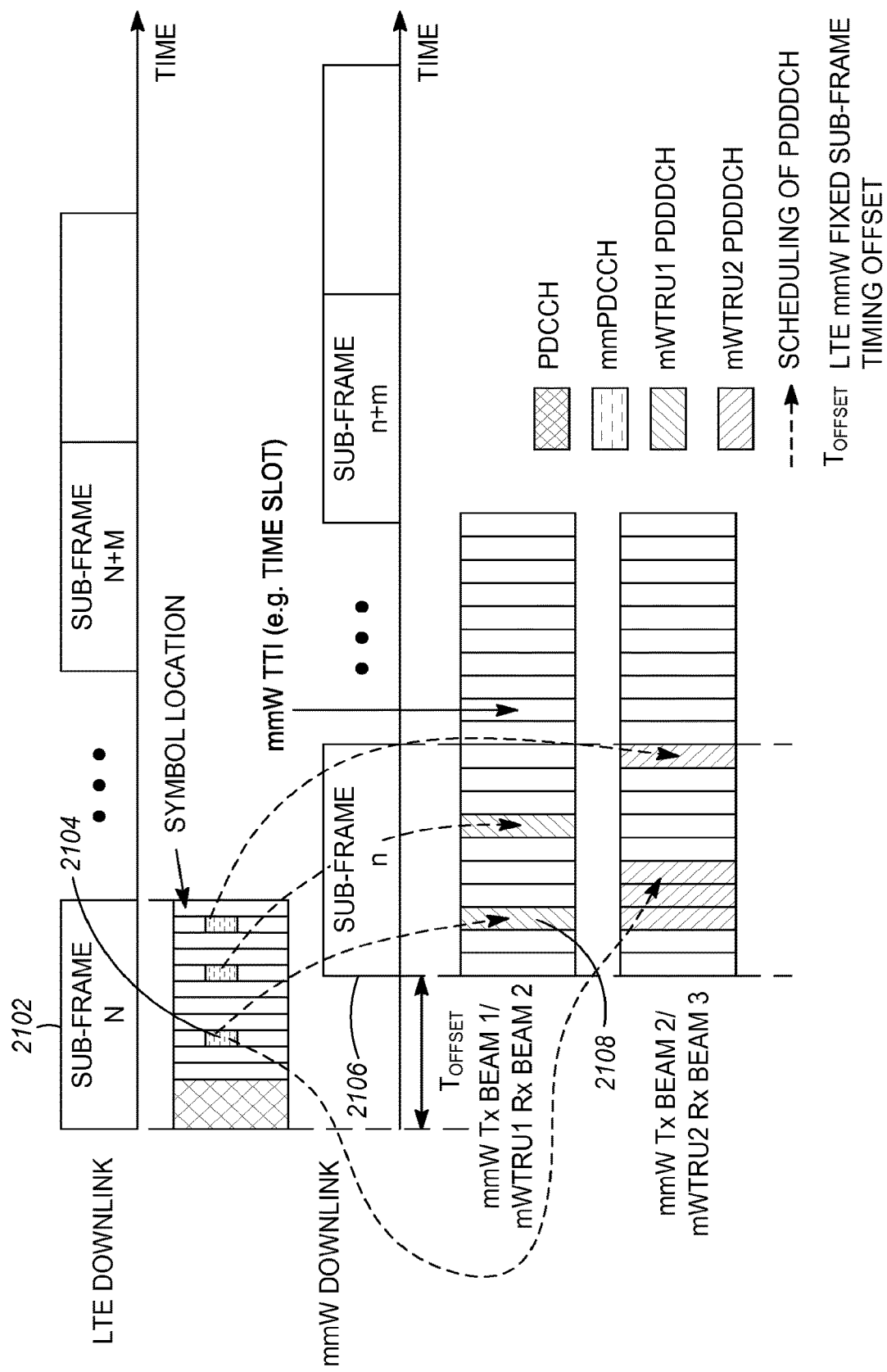
FIG. 21 illustrates an example of multiplexed mmPDCCH scheduling of PDDDCH.

FIG. 21 illustrates an example of multiplexed mmPDCCH scheduling of PDDDCH. As illustrated in FIG. 21, in a multiplexed mmPDCCH, an mWTRU may blind decode symbol location and frequency resources, e.g., to determine if its mmPDCCH is present for mmW scheduling. An mWTRU identity, such as C-RNTI, mmW-RNTI, or IMSI may be used to identify the mmPDCCH. The mmPDCCH may be multiplexed between multiple mWTRUs and may be transmitted over a frequency allocation with configuration signaled over RRC signaling to mWTRUs. mWTRUs may perform blind decoding at the configured symbol location and frequency resources according to their signaled mmPDCCH configuration. The mWTRU may demodulate and decode the mmPDCCH, e.g., if the mmPDCCH is detected in the blind decoding. The mWTRU may read mDCI information from the mmPDCCH.

In the dedicated mmPDCCH approach and/or the multiplexed mmPDCCH approach, the mWTRU may demodulate and decode one set of scheduling information mDCI for the associated mmW TTI. The timing offset between the downlink LTE reference subframe timing and mmW subframe timing may allow adequate time to decode PDCCH and mmPDCCH. The mWTRU may form a receive beam according to the scheduled receive beam information and may align an mmW subframe receiving timing according to the LTE subframe start timing and a predefined timing offset. The decoded mmPDCCH in LTE subframe N may be applied in mmW subframe n. In the example shown in the FIG. 20, the number of the symbol location where the mmPDCCH is located in the LTE subframe may be the same as the number of the associated mmW TTI in the mmW subframe.

The mWTRU may correlate and detect mmW sector BSRS and may segment BSRS according to the scheduled BSRS configuration. The mWTRU may synchronize its timing and frequency based on the reference signals. The mWTRU may demodulate and decode a scheduled mmW TTI. As illustrated in FIG. 20, mWTRU mWTRU1 mmPDCCH at symbol locations 2 2008 and 6 2020 of LTE subframe N 2002 may be applied to decode the mmW transmission in mmW TTI 2 2012 and 6 2022 in mmW subframe n 2014. The mWTRU WTRU2 mmPDCCH at symbol locations 2 2016 and 9 2018 may be applied to schedule the same mmW TTIs. As illustrated in FIG. 20, WTRU2 mmPDCCH 2016 may use predictive scheduling and the validity period field in mDCI to schedule mmW TTI 2, 3, and 4 with one mmPDCCH.

FIG. 21 illustrates an example of multiplexed mmPDCCH scheduling of PDDDCH. As illustrated in FIG. 21, when the mmPDCCH applies blind decoding, mWTRU1 and mWTRU2 mmPDCCHs may be multiplexed in symbols 2, 6, and 9. As illustrated in FIG. 21, mWTRU mWTRU1 mmPDCCH at symbol location 2 2104 of LTE subframe N 2102 may be used to decode the mmW transmission in mmW TTI 2 2108 of the mmW subframe 2106.

LTE PDCCH, EPDCCH, MAC control element(s), and/or mmPDCCH may be used for long-term scheduling of an mWTRU beam. Dedicated PDDCCH may be used for per-TTI dynamic scheduling of PDDDCH.

An LTE DCI may be used for mWTRU beam scheduling. A two-stage scheduling mechanism using LTE channels and mmW PDDCCH may be applied to reduce the LTE channel use by mmW scheduling. The mmW narrow beam pattern may carry dedicated PDDCCH and PDDDCH. The dedicated PDDCCH may include dynamic per-TTI scheduling information associated with one or more PDDDCHs. The long-term scheduling information may be carried in an LTE DCI transmitted in PDCCH, EPDCCH, or MAC control element, which may include, for example, transmit beam scheduling, receive beam scheduling, PDDCCH configuration (e.g., frequency, time, and/or code (scrambling) configuration), modulation and coding scheme (e.g., may be predefined and not included), and/or demodulation reference signal configuration for PDDCCH. This scheduling information may be read periodically or triggered by one or more predefined events.

Figure 22:
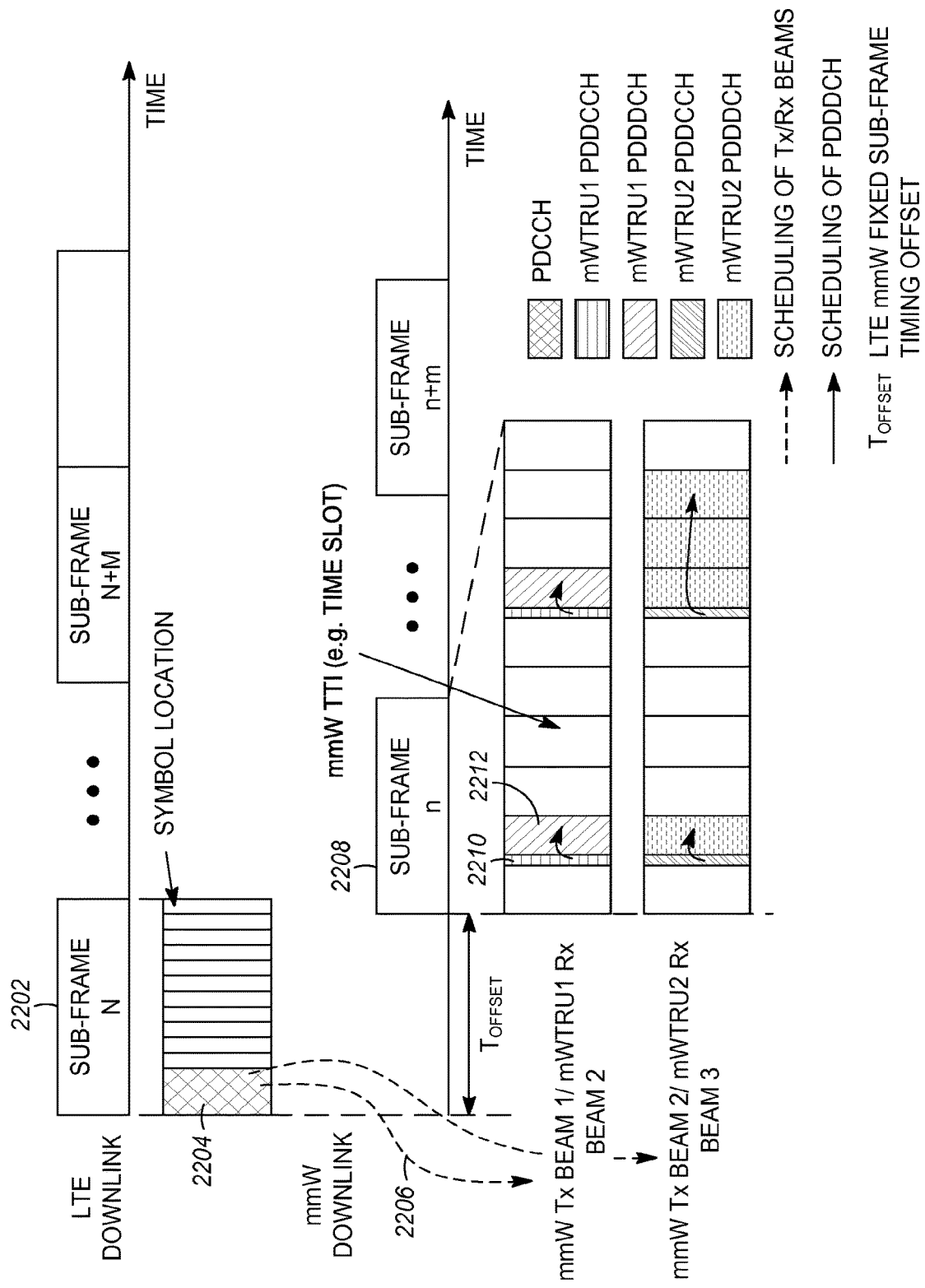
FIG. 22 illustrates an example of PDCCH and PDDCCH scheduling of PDDDCH.

FIG. 22 illustrates an example of PDCCH and PDDCCH scheduling of PDDDCH. As illustrated in FIG. 22, an mWTRU may monitor PDCCH 2204 (in LTE sub-frame N 2202), for example, as specified in LTE standards. The mWTRU may detect an LTE DCI carried in its PDCCH, e.g., using its C-RNTI. The mWTRU may decode the scheduling information for transmit and receive beam assignment 2206, dedicated PDDCCH configuration, etc. The mWTRU, e.g., mWTRU1 may decode dedicated PDDCCH 2210 configuration to locate and/or decode PDDDCH 2212 within mmW subframe n 2208.

Figure 23:
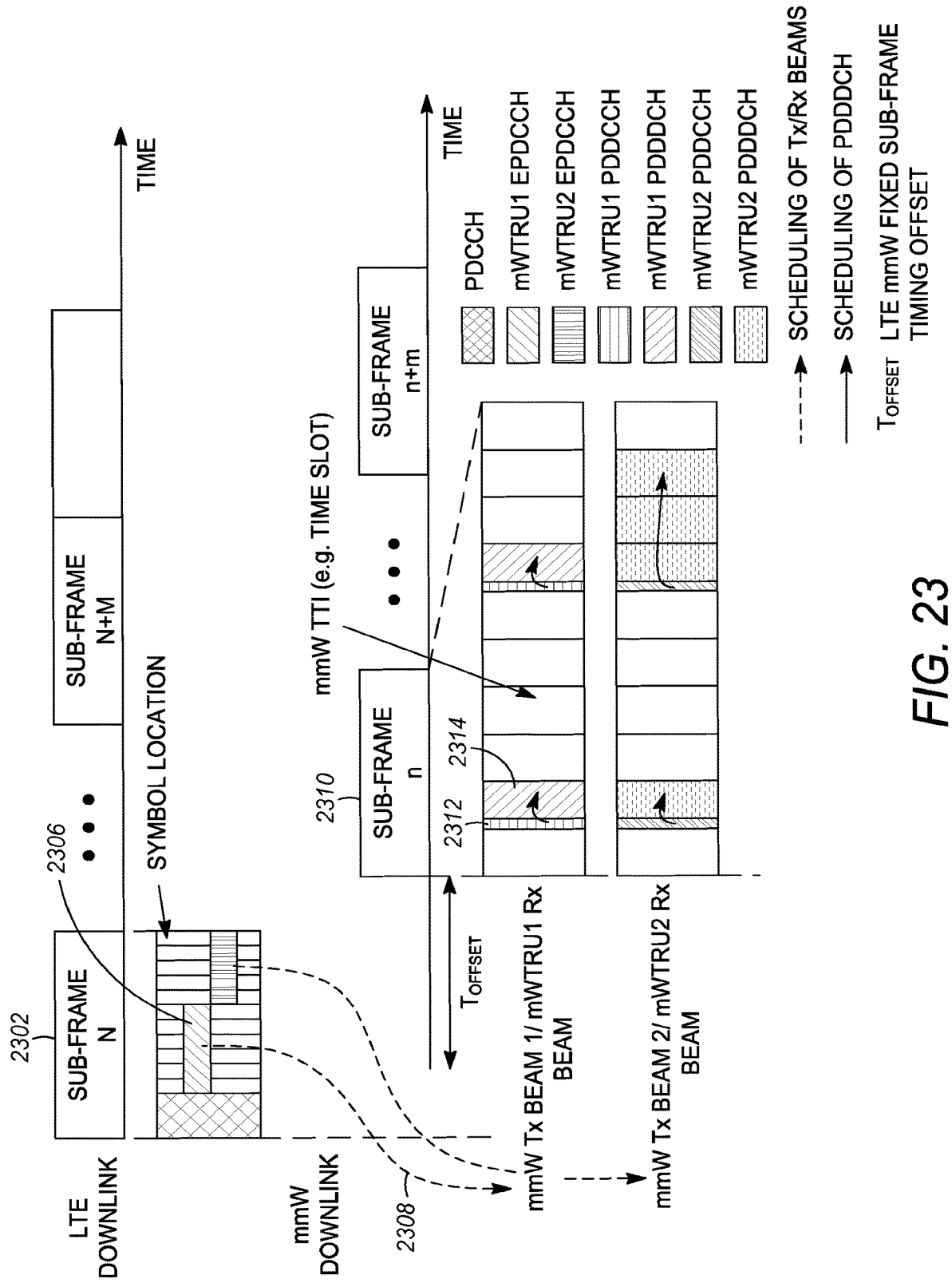
FIG. 23 illustrates an example of enhanced PDCCH (EPDCCH) and PDDCCH scheduling of PDDDCH.

FIG. 23 illustrates an example of EPDCCH and PDDCCH scheduling of PDDDCH. As illustrated in FIG. 23, an mWTRU may monitor EPDCCH 2306 (in LTE sub-frame N 2302), for example, as specified in LTE standards. The mWTRU may detect an LTE DCI carried in its EPDCCH, e.g., using its C-RNTI. The mWTRU may decode the scheduling information for transmit and receive beam assignment 2308, dedicated PDDCCH configuration, etc. The mWTRU, e.g., mWTRU1 may use the PDDCCH 2312, e.g., within mmW subframe n 2310, to locate and/or decode PDDDCH 2314.

Figure 24:
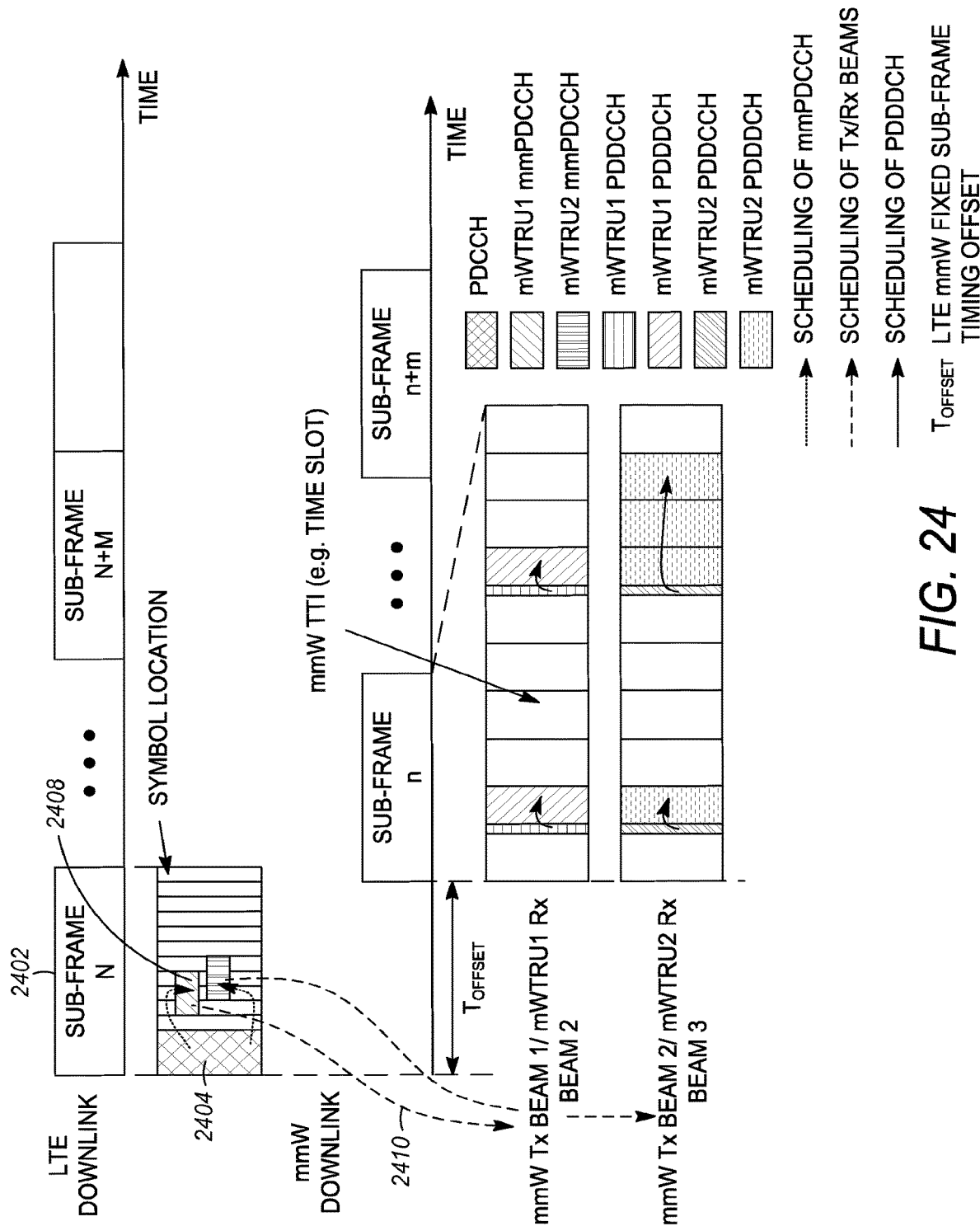
FIG. 24 illustrates an example of long term evolution (LTE) medium access control (MAC) control element (CE) and dedicated PDDCCH scheduling of PDDDCH.

FIG. 24 illustrates an example of LTE MAC control element and dedicated PDDCCH scheduling of PDDDCH. As illustrated in FIG. 24, an mWTRU may monitor PDCCH 2404 (in sub-frame N 2402), for example, as specified in LTE standards. The mWTRU may detect an LTE DCI carried in its PDCCH, e.g., using its C-RNTI. The mWTRU may decode the PDSCH scheduling information. The mWTRU may read the MAC control element in PDSCH 2408 and may receive mmW scheduling information 2410 including transmit and receive beam. This may involve higher layer operation and retransmission and may have larger scheduling latency. Beam scheduling may be a long-term event. Latency may not cause issues with such beam scheduling.

Figure 25:
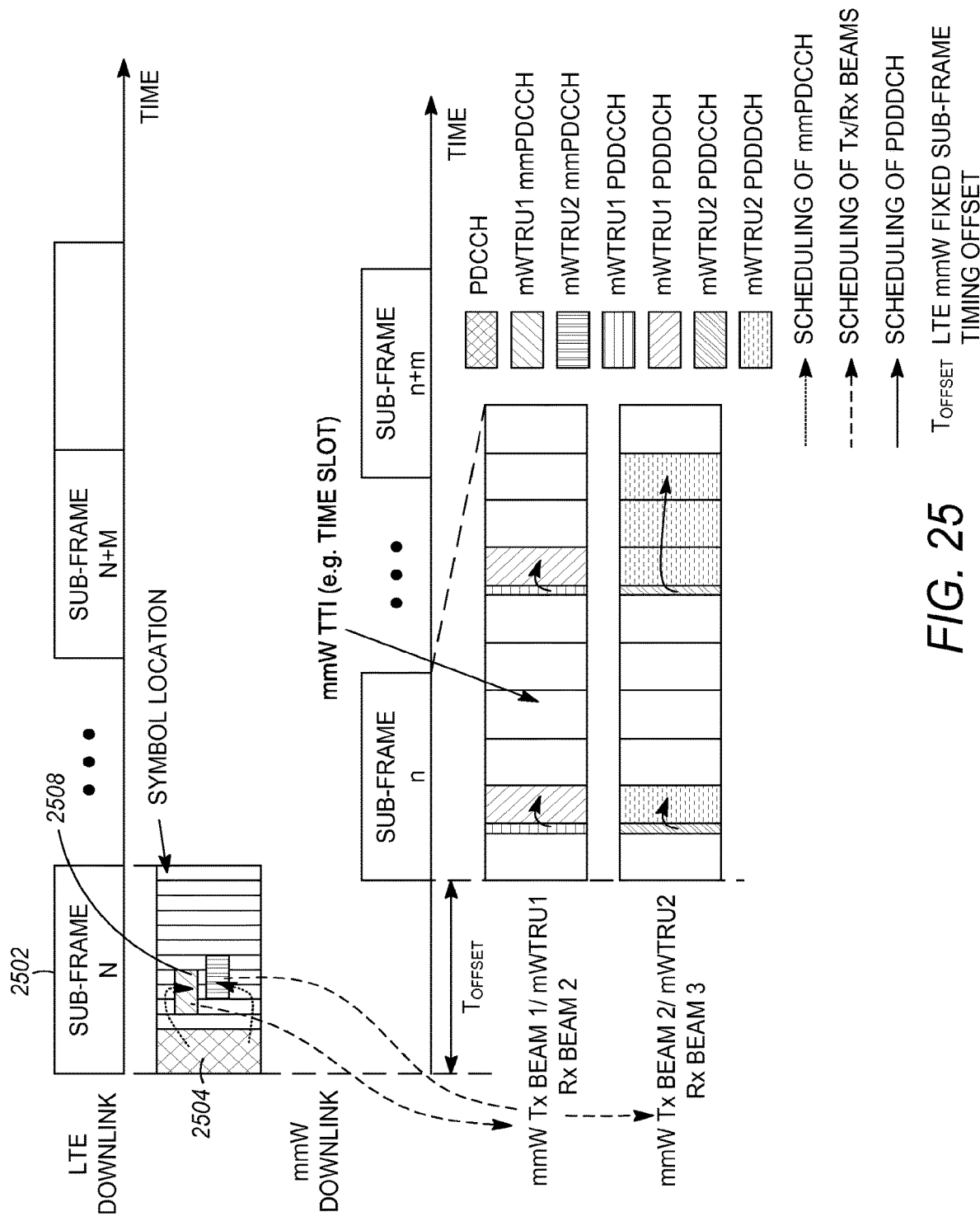
FIG. 25 illustrates an example of dedicated mmPDCCH and dedicated PDCCH scheduling of PDDDCH.

FIG. 25 illustrates an example of dedicated mmPDCCH and dedicated PDCCH scheduling of PDDDCH. As illustrated in FIG. 25, an mWTRU may monitor PDCCH 2504 (in LTE sub-frame 2502), for example, as specified in LTE standards and may detect mmPDCCH 2508 specific LTE DCI carried in its PDCCH using its C-RNTI. The mWTRU may decode information to receive its upcoming mmPDCCH. The mmPDCCH specific LTE DCI may include, for example, mmPDCCH symbol location, frequency resource, transport format, and/or other configuration parameters. This mmPDCCH 2508 may not be limited to one symbol location and may span multiple symbol locations. The mWTRU may locate and decode the mmPDCCH in the schedule symbol location of the same LTE TTI. As the mWTRU signaled by the PDCCH (e.g., the mWTRU signaled by the PDCCH) may read the mmPDCCH. Blind decoding may not be necessary at the symbol location. The mmPDCCH may carry mDCI, which may include the beam allocation, BSRS, PDDDCH resource allocation, etc. The mWTRUs, e.g., mWTRU1 and mWTRU2 may receive scheduling information including transmit and receive beam scheduling information as described herein.

Figure 26:
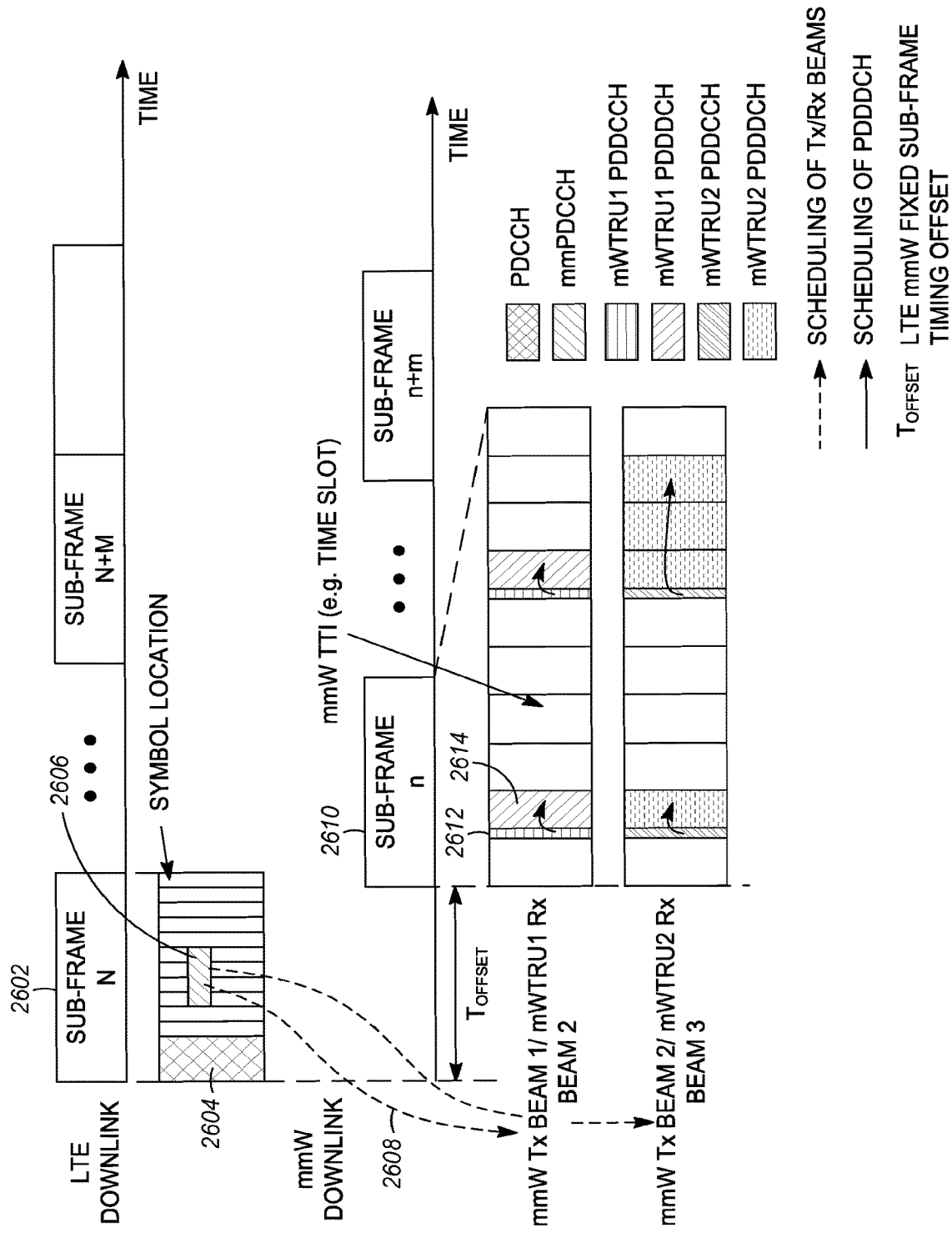
FIG. 26 illustrates an example of multiplexed mmPDCCH and dedicated PDCCH scheduling of PDDDCH.

FIG. 26 illustrates an example of multiplexed mmPDCCH and dedicated PDCCH scheduling of PDDDCH. As illustrated in FIG. 26, an mWTRU may monitor PDCCH 2604 (in subframe N 2602), for example, as specified in LTE standards and may blind decode the symbol location and frequency resources to determine if its mmPDCCH is present for mmW scheduling. An mWTRU identity, such as C-RNTI, mmW-RNTI, or IMSI may be used to identify the mmPDCCH 2606. The mmPDCCH 2606 may be multiplexed between multiple mWTRUs and may be transmitted over a frequency allocation with configuration signaled over RRC signaling to mWTRUs. mWTRUs may perform blind decoding at the configured symbol location and frequency resources according to their signaled mmPDCCH configuration. The mWTRU may demodulate and decode the mmPDCCH if it is detected in the blind decoding process and may read mDCI information. The PDCCH may not be applied in this approach, and no PDCCH capacity may be occupied by mmW scheduling.

In the approaches illustrated in FIGS. 22-26, the mWTRU may form the receive beam according to the scheduled receive beam information and may align the mmW subframe receiving timing according to the LTE subframe start timing and a predefined timing offset. The mWTRU may correlate and detect mmW sector BSRS and may subsequently segment BSRS according to the scheduled BSRS configuration. The mWTRU may subsequently synchronize its timing and frequency based on the reference signals. The mWTRU may demodulate and decode the dedicated PDDCCH according to the configuration received in LTE DCI or predefined parameter signaled in higher layer signaling, such as SIB. The mWTRU may demodulate and decode a scheduled mmW TTI PDDDCH based on the dedicated PDDCCH mDCI. The mWTRU may read the validity period for each scheduling instance and apply the validity period accordingly to consecutive mmW TTIs. The mWTRU mWTRU2 PDDCCH may use predictive scheduling and the validity period field in mDCI to schedule mmW TTI 6, 7, and 8 with one dedicated PDDDCH.

Figure 27:
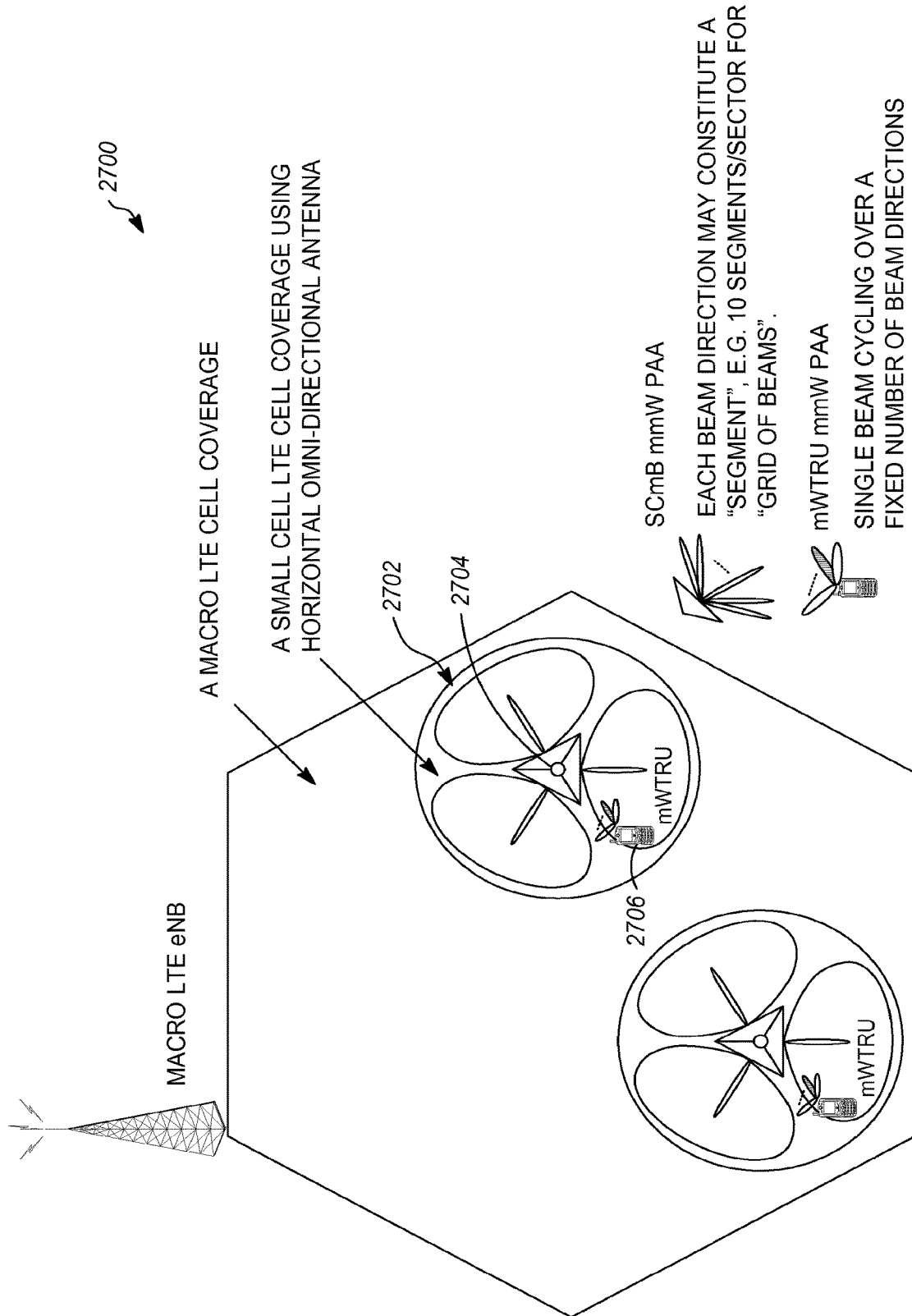
FIG. 27 illustrates an exemplary mmW system with an mmW broad beam pattern.

An mWTRU may continuously or periodically read a broad-beam-common PDDCCH to receive beam and dynamic per-TTI scheduling information for data transmission and configuration of two-dimensional beam-specific measurement of beam signal strength or beam SINR metrics. FIG. 27 illustrates an example mmW system 2700 with an mmW broad beam pattern. An LTE small cell 2702 may apply a horizontal omnidirectional antenna 2704 in an LTE frequency band. One or more (e.g., three) mmW PAAs may be placed to create three mmW sectors, each with a horizontal coverage of 120°. Coverage may be determined by the link budget of broad-beam-common PDDCCH with a low-gain antenna. The channel design may use a conservative coding rate and modulation. An mmW broad beam pattern may carry PDDCCH to achieve a wide coverage of mWTRUs. Due to the large width of the beam and the resulting low antenna gain, the broad beam may not carry PDDDCH.

As illustrated in FIG. 27, an mWTRU 2706 may attach to an SCmB using an LTE CS procedure, e.g., based on the best LTE cell and may receive mmW specific configuration in SIB regarding the broad-beam-common PDDCCH carried in the broad beam per sector.

The configuration may include mmW sector BSRS code indices that may identify an mmW sector. For example, the BSRS may use a pseudorandom sequence, such as ZC sequences with good auto- and cross-correlation properties and with good performance against timing/frequency offset. In the case of ZC sequences, sector sequences may be generated based on one ZC base sequence specific to this SCmB. This may be used to identify the broad beam.

The configuration may include mmW segment BSRS code indices that may identify each mmW segment within one identified sector. The mmW segment identity may be encoded in a control field following BSRS, for example, of three bits (e.g., up to eight identities) in a common PDDCCH. This may be applied to identify a narrow data beam.

The configuration may include a frequency used for the sector BSRS, segment BSRS, and the broad-beam-common PDDCCH within the narrow beam. The configuration may include subframe, periodicity, transmission pattern, and/or other configuration parameters of the sector, segment BSRS, and the broad-beam-common PDDCCH. The configuration may include a time domain resource, e.g., symbol location, time slot or subframe of the BSRS, and the broad-beam-common PDDCCH transmission. The configuration may include the broad-beam-common PDDCCH transport configuration parameters, e.g., the information payload and transport format of the control fields carried in the channel.

PDDDCH scheduling information may be carried in a broad-beam-common PDDCCH. The scheduling information may include, for example, transmit and receive beam scheduling, dynamic frame structure configuration, broad-beam-common PDDCCH resource allocation, PDDDCH frequency resource allocation, code assignment, carrier indicator, modulation and coding scheme, new data indication, redundancy version, number of layers, channel state information request, beam specific measurement request, and/or mmW UCI resource allocation.

Figure 28:
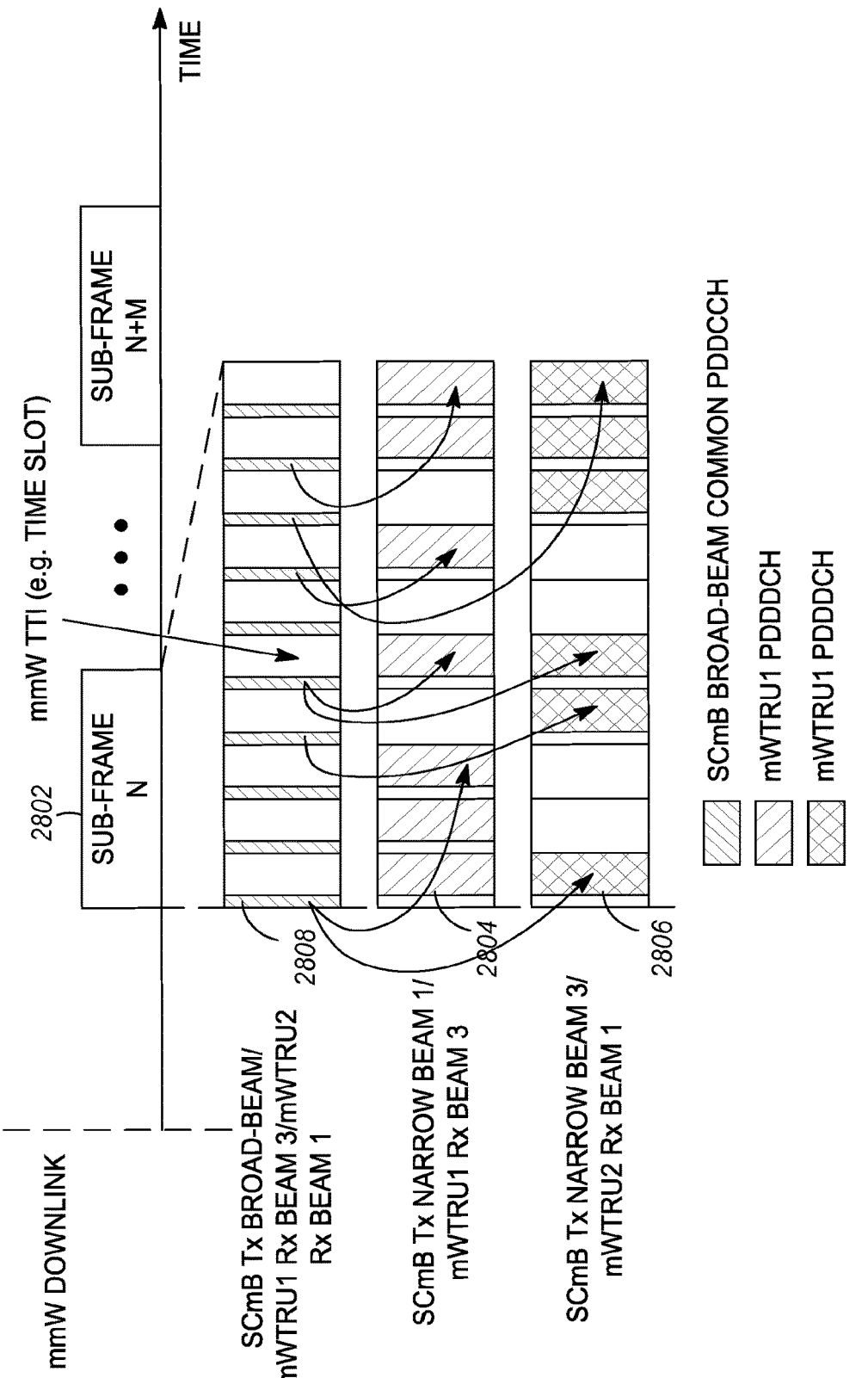
FIG. 28 illustrates an example of multiplexed broad-beam-common PDDCCH scheduling of PDDDCH.

FIG. 28 illustrates an example of multiplexed broad-beam-common PDDCCH scheduling of PDDDCH. As illustrated in FIG. 28, an mWTRU may form an mmW narrow receive beam and may correlate and detect sector BSRS in the broad beam. The sector BSRS may be in the sector-wide beam. An mWTRU may detect the BSRS when it is within the range. The mWTRU may synchronize in timing and frequency with the signaled or strongest BSRS that may belong to its associated SCmB. The mWTRU may demodulate and decode the broad-beam-common PDDCCH in a preconfigured control period 2808 according to the preconfigured transport format. The reading of PDDCCH may be continuous, periodical or triggered by events.

The mWTRU may check the CRC or the payload using a unique mWTRU identity including C-RNTI, mmW-RNTI, or IMSI to determine if there is an mDCI present for mmW transmission. The broad-beam-common PDDCCH may be multiplexed with multiple mWTRUs' PDDCCH. Blind decoding may be applied. The network may signal an mWTRU via RRC signaling its broad-beam-common PDDCCH configuration. The mWTRU may receive the PDDDCH scheduling information including beam and per-TTI components.

The mWTRU may form the schedule receive beam at the scheduled direction and may correlate and detect the segment BSRS of the scheduled narrow transmit beam. Guard time may be reserved between broad-beam-common PDDCCH and the PDDDCH to allow beam forming, automatic gain control (AGC) convergence, synchronization, etc., for an mWTRU to get ready to receive the scheduled transmit beam. When the transmit beam is detected, the mWTRU may synchronize in timing and frequency with the scheduled segment BSRS. The mWTRU may demodulate and decode the PDDDCH 2806 with the help of the scheduled DMRS.

The mWTRU may read the validity period for each scheduling instance and apply the validity period accordingly to consecutive mmW TTIs. As shown by way of example in FIG. 28, mWTRUs mWTRU1 and mWTRU2 may be scheduled in mmW TTI 0 (2804 and 2806) of mmW subframe N 2802, but mWTRU mWTRU1 may have a predictive scheduling that lasts for more than at least two TTIs (e.g., three TTIs). During the data transmission, the broad-beam-common PDCCH may send a measurement request to an mWTRU to measure one or more transmit beams with measurement occasion configuration. During the measurement occasion, the mWTRU may cycle the beam for beam-specific measurement as disclosed herein.

The processes and instrumentalities described herein may apply in any combination, may apply to other wireless technologies, and for other services. A WTRU may refer to an identity of the physical device, or to the user's identity such as subscription related identities, e.g., mobile station international subscriber directory number (MSISDN), session initiation protocol (SIP) uniform resource identifier (URI), etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU (e.g., an mWTRU), UE, terminal, base station, RNC, and/or any host computer.

The invention claimed is:

1. A wireless transmit/receive unit (WTRU), the WTRU comprising;
    a processor, the processor configured to:
        receive, via a control channel, a downlink control information (DCI), wherein the DCI indicates a beam indicator and indicates scheduling information for a physical downlink shared channel (PDSCH) transmission;
        determine a guard time;
        determine whether, based on the scheduling information, the PDSCH transmission is to be received after the guard time; and
        on a condition that the PDSCH transmission is to be received after the guard time, receive the PDSCH transmission based on the scheduling information and the beam indicator.

2. The WTRU of claim 1, wherein the scheduling information indicates a reference signal used for synchronization.

3. The WTRU of claim 2, wherein the reference signal is a beam specific reference signal (BSRS).

4. The WTRU of claim 3, wherein the processor is further configured to:
    detect a beam segment associated with the BSRS; and
    synchronize with the beam segment.

5. The WTRU of claim 2, wherein the reference signal is a channel state information reference signal (CSI-RS).

6. The WTRU of claim 1, wherein the DCI further indicates a channel state information (CSI) request.

7. The WTRU of claim 1, wherein the guard time is a number of orthogonal frequency multiplexing (OFDM) symbols.

8. The WTRU of claim 1, wherein the processor is further configured to determine that the PDSCH transmission is to be received after the guard time by determining that the PDSCH transmission is to occur a number of OFDM symbols after the reception of the DCI.

9. A method performed by a wireless transmit/receive unit (WTRU), the method comprising:
   receiving, via a control channel, a downlink control information (DCI), wherein the DCI indicates a beam indicator and indicates scheduling information for a physical downlink shared channel (PDSCH) transmission;
   determining a guard time;
   determining whether, based on the scheduling information, the PDSCH transmission is to be received after the guard time; and
   on a condition that the PDSCH transmission is to be received after the guard time, receiving the PDSCH transmission based on the scheduling information and the beam indicator.

10. The method of claim 9, wherein the scheduling information indicates a reference signal used for synchronization.

11. The method of claim 10, wherein the reference signal is a beam specific reference signal (BSRS).

12. The method of claim 11, the method further comprising:
   detect a beam segment associated with the BSRS; and
   synchronize with the beam segment.

13. The method of claim 10, wherein the reference signal is a channel state information reference signal (CSI-RS).

14. The method of claim 9, wherein the DCI further indicates a channel state information (CSI) request.

15. The method of claim 9, wherein the guard time is a number of orthogonal frequency multiplexing (OFDM) symbols.

16. The method of claim 9, wherein determining that the PDSCH transmission is to be received after the guard time by determining that the PDSCH transmission is to occur a number of OFDM symbols after the reception of the DCI.

* * * * *